United States Patent
Hayase et al.

(10) Patent No.: US 11,948,398 B2
(45) Date of Patent: *Apr. 2, 2024

(54) FACE RECOGNITION SYSTEM, FACE RECOGNITION METHOD, AND STORAGE MEDIUM

(71) Applicant: NEC Corporation, Tokyo (JP)

(72) Inventors: Noriaki Hayase, Tokyo (JP); Hiroshi Tezuka, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/121,267

(22) Filed: Mar. 14, 2023

(65) Prior Publication Data

US 2023/0222837 A1 Jul. 13, 2023

Related U.S. Application Data

(63) Continuation of application No. 17/199,814, filed on Mar. 12, 2021, now Pat. No. 11,631,278, which is a
(Continued)

(30) Foreign Application Priority Data

Feb. 26, 2016 (JP) .................... 2016-036406

(51) Int. Cl.
*G06T 7/00* (2017.01)
*G06F 21/32* (2013.01)
(Continued)

(52) U.S. Cl.
CPC ............ *G06V 40/172* (2022.01); *G06F 21/32* (2013.01); *G06Q 20/40145* (2013.01);
(Continued)

(58) Field of Classification Search
CPC .. G06K 9/00288; G06K 9/00228; G06T 7/00; G06T 7/38; G06T 2207/30201; G06F 21/32
(Continued)

(56) References Cited

U.S. PATENT DOCUMENTS 5,432,864 A * 7/1995 Lu .................. G06V 40/169
340/5.83
7,039,221 B1 * 5/2006 Tumey .................. G07C 9/37
382/118
(Continued)

FOREIGN PATENT DOCUMENTS

CN 1494037 A 5/2004
CN 103209303 A 7/2013
(Continued)

OTHER PUBLICATIONS

U.S. Notice of Allowance for U.S. Appl. No. 16/079,814 dated Mar. 10, 2021.
(Continued)

*Primary Examiner* — Van D Huynh

(57) ABSTRACT

A face recognition system, a face recognition method, and a storage medium that can perform face matching smoothly in a short time are provided. The face recognition system includes: a face detection unit that detects a face image from an image including an authentication subject as a detected face image; a storage unit stores identification information identifying the authentication subject and a registered face image of the authentication subject in association with each other; and a face matching unit that, in response to acquisition of the identification information identifying the authentication subject, matches, against the registered face image corresponding to the acquired identification informa-
(Continued)

tion, the detected face image detected by the face detection unit from an image captured before the acquisition.

18 Claims, 31 Drawing Sheets

Related U.S. Application Data continuation of application No. 16/288,231, filed on Feb. 28, 2019, now Pat. No. 10,977,483, which is a continuation of application No. 16/079,814, filed as application No. PCT/JP2017/006861 on Feb. 23, 2017, now Pat. No. 11,055,513.

(51) Int. Cl.
*G06Q 20/40* (2012.01)
*G06T 7/38* (2017.01)
*G06V 40/16* (2022.01)
*G06V 40/50* (2022.01)

(52) U.S. Cl.
CPC .............. *G06T 7/00* (2013.01); *G06T 7/0002* (2013.01); *G06T 7/38* (2017.01); *G06V 40/161* (2022.01); *G06V 40/50* (2022.01); *G06T 2207/30168* (2013.01); *G06T 2207/30201* (2013.01)

(58) Field of Classification Search
USPC ......................................................... 382/118
See application file for complete search history.

(56) References Cited

U.S. PATENT DOCUMENTS

| | | | | |
|---|---|---|---|---|
| 2003/0006277 A1* | 1/2003 | Maskatiya | ............. | G07C 9/257 235/379 |
| 2003/0039380 A1* | 2/2003 | Sukegawa | ............... | G06F 18/28 382/118 |
| 2005/0262187 A1 | 11/2005 | Klemets | ............. | G06K 9/00288 348/77 |
| 2005/0276483 A1* | 12/2005 | Miyake | ................ | G06V 40/172 382/209 |
| 2006/0082439 A1* | 4/2006 | Bazakos | ................ | G07B 15/06 340/5.82 |
| 2006/0262187 A1* | 11/2006 | Takizawa | ............. | G06V 40/172 348/77 |
| 2007/0291998 A1* | 12/2007 | Takizawa | ................ | G07C 9/37 382/118 |
| 2009/0060293 A1 | 3/2009 | Nagao et al. | | |
| 2012/0213420 A1 | 8/2012 | Steiner | | |
| 2013/0129159 A1 | 5/2013 | Huijgens et al. | | |
| 2013/0301886 A1* | 11/2013 | Koda | ...................... | G06F 21/32 382/118 |
| 2014/0119618 A1* | 5/2014 | Kim | ..................... | G06V 10/993 382/118 |
| 2015/0081581 A1* | 3/2015 | Gishen | ................. | G06Q 10/083 705/330 |
| 2016/0275518 A1* | 9/2016 | Bowles | ................ | G06V 40/166 |
| 2016/0350587 A1 | 12/2016 | Bataller et al. | | |
| 2021/0192190 A1* | 6/2021 | Zheng | ................. | G06V 10/751 |

FOREIGN PATENT DOCUMENTS

| | | |
|---|---|---|
| JP | 2001-266152 A | 9/2001 |
| JP | 2002-352291 A | 12/2002 |
| JP | 2003-317100 A | 11/2003 |
| JP | 2005-092611 A | 4/2005 |
| JP | 2006-236244 A | 9/2006 |
| JP | 2008-040781 A | 2/2008 |
| JP | 2008-146137 A | 6/2008 |
| JP | 2012-27668 A | 2/2012 |
| JP | 2012-068924 A | 4/2012 |
| JP | 2013-137604 A | 7/2013 |
| JP | 2013-182235 A | 9/2013 |
| JP | 2013-198043 A | 9/2013 |
| JP | 2014-67345 A | 4/2014 |
| JP | 2014-115784 A | 5/2014 |
| WO | 2009/016846 A1 | 2/2009 |

OTHER PUBLICATIONS

Japanese Office Action for JP Application No. 2020-181056 dated Oct. 14, 2021 with English Translation.
EP Office Action for EP Application No. EP20157940.6 dated Jan. 27, 2022.
Chinese Office Action for CN Application No. 201780013658.8 dated Mar. 25, 2022 with English Translation.
CN Office Action for CN Application No. 201780013658.8, dated Aug. 15, 2022 with English Translation.
Deng Yi et al., "Application of Face Recognition Technology in Museum Security System", Microcomputer Applications vol. 29, No. 11, 2013, pp. 60-62.
JP Office Action for JP Application No. 2022-198283, dated Oct. 31, 2023 with English Translation.
International Search Report for PCT/JP2017/008869 dated May 30, 2017 (PCT/ISA/210).
NEC Corporation, "Face Authentication: Gate System", online, searched on Feb. 12, 2016, 1 page Internet <URL: http://jpn.nec.com/adjust/entry.html>.
Communication dated Apr. 28, 2020, from the European Patent Office in European Application No. 20167940.6.
Communication dated Sep. 29, 2020, from the Japanese Patent Office in application No. 2016-501767.

* cited by examiner

FIG. 4

| DETECTION NO. | CAPTURING TIME | DETECTED FACE IMAGE | FACE FEATURE AMOUNT |
|---|---|---|---|
| 1 | 2016/02/01 08:30:01 | | [FACE FEATURE AMOUNT D1] |
| 2 | 2016/02/01 08:30:02 | | [FACE FEATURE AMOUNT D2] |
| 3 | 2016/02/01 08:30:03 | | [FACE FEATURE AMOUNT D3] |
| 4 | 2016/02/01 08:30:04 | | [FACE FEATURE AMOUNT D4] |
| 5 | 2016/02/01 08:30:05 | | [FACE FEATURE AMOUNT D5] |
| 6 | 2016/02/01 08:30:06 | | [FACE FEATURE AMOUNT D6] |
| ⋮ | ⋮ | ⋮ | ⋮ |

FIG. 17A
| ID | DETECTED FACE IMAGE | FACE FEATURE AMOUNT | MATCHING SCORE | FACE-LIKELIHOOD SCORE |
|---|---|---|---|---|
| 0005 |  | [FACE FEATURE AMOUNT D3] | 70 | 69 |
| 0008 |  | [FACE FEATURE AMOUNT D4] | 85 | 92 |
| 0009 |  | [FACE FEATURE AMOUNT D5] | 77 | 80 |
| ⋮ | ⋮ | ⋮ | ⋮ | ⋮ |

FIG. 17B

| ID | REGISTERED FACE IMAGE | FACE FEATURE AMOUNT |
|---|---|---|
| 0005 | | [FACE FEATURE AMOUNT R5] |
| 0005 | | [FACE FEATURE AMOUNT D3] |

FIG. 17C
| ID | REGISTERED FACE IMAGE | FACE FEATURE AMOUNT | PRIORITY |
|---|---|---|---|
| 0005 |  | [FACE FEATURE AMOUNT D3] | 1 |
| 0005 |  | [FACE FEATURE AMOUNT R5] | 2 |

FACE RECOGNITION SYSTEM, FACE RECOGNITION METHOD, AND STORAGE MEDIUM

CROSS REFERENCE TO RELATED APPLICATION

This application is a continuation of U.S. patent application Ser. No. 17/199,814, filed on Mar. 12, 2021, which is a continuation of U.S. patent application Ser. No. 16/288,231, filed on Feb. 28, 2019, which issued as U.S. Pat. No. 10,977,483, which is a continuation of U.S. patent application Ser. No. 16/079,814, filed on Aug. 24, 2018, which issued as U.S. Pat. No. 11,055,513, which is a National Stage of International Application No. PCT/JP2017/006861 filed on Feb. 23, 2017, which claims priority from Japanese Patent Application No. 2016-036406, filed Feb. 26, 2016, the contents of all of which are incorporated herein by reference in their entirety.

TECHNICAL FIELD

The present invention relates to a face recognition system, a face recognition method, and a storage medium.

Background Art

In recent years, biometric authentication that performs authentication using biometric information that is information on a physical feature or behavior feature of a human has been utilized in a situation of identity verification. Face authentication that is one of the forms of biometric authentication is advantageous because of less mental stress at an authentication subject, ability of authentication from a distant place, a mental deterrent effect against a fraud, or the like.

Face authentication technologies have been utilized for identity verification in various fields. For example, in a gate system installed in an entrance gate of a facility such as a theme park, a face authentication technology is utilized for identity verification of visitors who use a ticket such as annual pass thereof or the like (Non Patent Literature 1).

CITATION LIST

Non Patent Literature

NPL 1: NEC Corporation, "Face Authentication: Gate System", [online], [searched on Feb. 12, 2016], Internet <URL: http://jpn.nec.com/ad/usj/entry.html>

SUMMARY OF INVENTION

Technical Problem

In the face authentication technology in the conventional gate system, it is necessary for the staff of a facility to operate a camera to capture a face image of a visitor for face matching after ticket presentation in which the visitor causes a reading unit of a gate apparatus to read information on the ticket. In this way, since the conventional gate system requires the operation of capturing a face image of a visitor after the visitor causes information on a ticket to be read and before the visitor enters the facility, many visitors waiting for identity verification by face authentication may be detained at the entrance gate of the facility.

The present invention intends to provide a face recognition system, a face recognition method, and a storage medium that can perform face matching smoothly in a short time.

Solution to Problem

According to one example aspect of the present invention, provided is a face recognition system including: a face detection unit that detects a face image from an image including an authentication subject as a detected face image; a storage unit that stores identification information identifying the authentication subject and a registered face image of the authentication subject in association with each other; and a face matching unit that, in response to acquisition of the identification information identifying the authentication subject, matches, against the registered face image corresponding to the acquired identification information, the detected face image detected by the face detection unit from an image captured before the acquisition.

According to another example aspect of the present invention, provided is a face recognition method including: detecting a face image from an image including an authentication subject as a detected face image; and in response to acquisition of the identification information identifying the authentication subject, matching, against the registered face image associated with the acquired identification information, the detected face image detected from an image captured before the acquisition.

According to yet another example aspect of the present invention, provides is a storage medium in which a program is stored, and the program causes a computer to execute: detecting a face image from an image including an authentication subject as a detected face image; and in response to acquisition of the identification information identifying the authentication subject, matching, against the registered face image associated with the acquired identification information, the detected face image detected from an image captured before the acquisition.

Advantageous Effects of Invention

According to the present invention, face matching can be performed smoothly in a short time.

BRIEF DESCRIPTION OF DRAWINGS

FIG. 4 is a schematic diagram illustrating an example of various data for detected face images temporarily stored in a storage unit of a face matching apparatus in the face recognition system according to the first example embodiment of the present invention.

FIG. 17A is a schematic diagram illustrating various data in automatic update of a registered face image in the face recognition system according to the fourth example embodiment of the present invention.

FIG. 17B is a schematic diagram illustrating various data in automatic update of a registered face image in the face recognition system according to the fourth example embodiment of the present invention.

FIG. 17C is a schematic diagram illustrating various data in automatic update of a registered face image in the face recognition system according to the fourth example embodiment of the present invention.

DESCRIPTION OF EMBODIMENTS

First Example Embodiment

A face recognition system and a face recognition method according to a first example embodiment of the present invention will be described by using FIG. 1 to FIG. 11.

Figure 1:
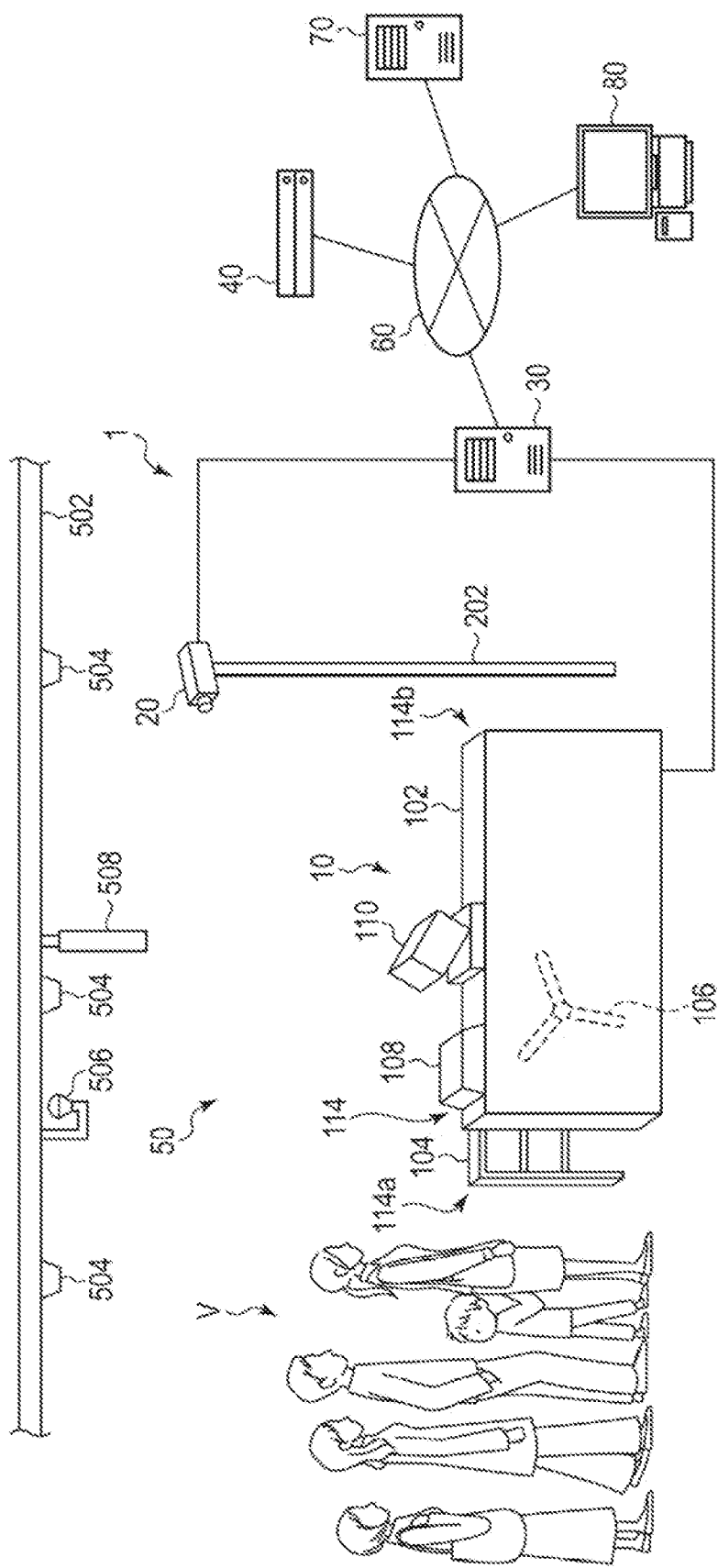
FIG. 1 is a schematic diagram illustrating a face recognition system according to a first example embodiment of the present invention.
Figure 2:
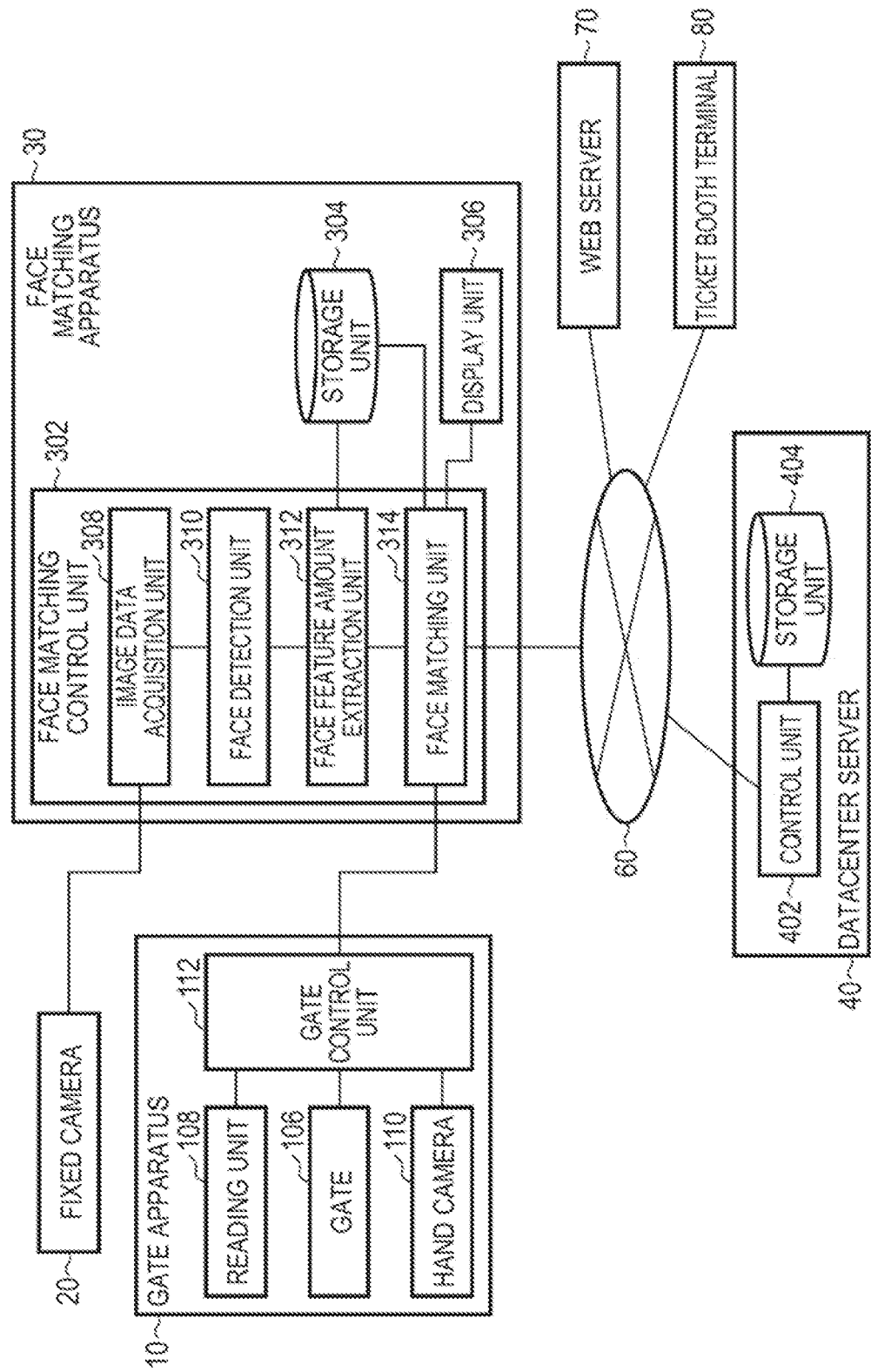
FIG. 2 is a block diagram illustrating a functional configuration of the face recognition system according to the first example embodiment of the present invention.
Figure 3:
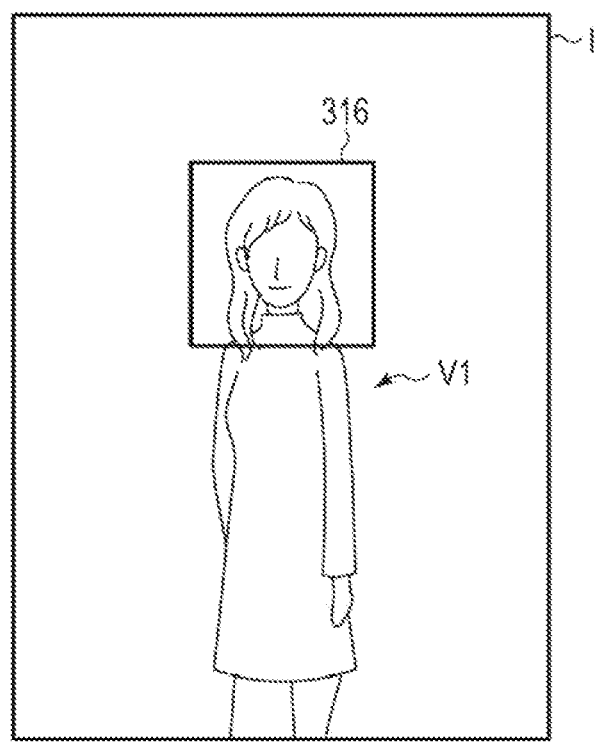
FIG. 3 is a schematic diagram illustrating an example of an image captured by a fixed camera in the face recognition system according to the first example embodiment of the present invention.
Figure 5:
FIG. 5 is a schematic diagram illustrating an example of a process of N:1 matching in the face recognition system according to the first example embodiment of the present invention.
Figure 6:
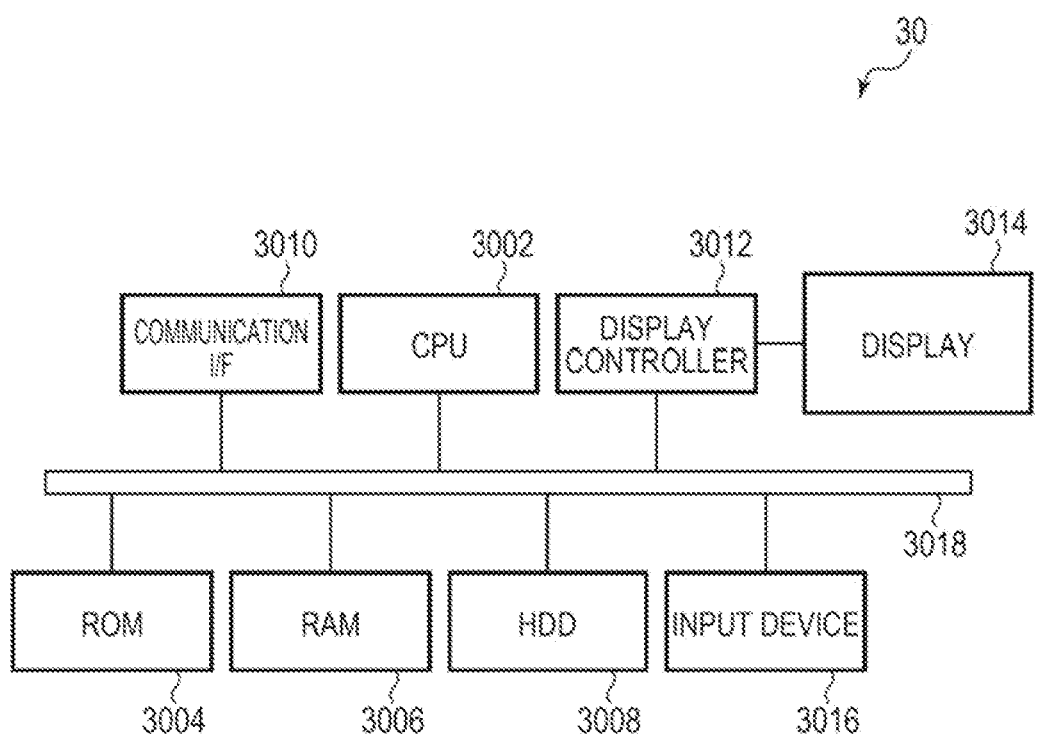
FIG. 6 is a block diagram illustrating an example of a hardware configuration of a face matching apparatus in the face recognition system according to the first example embodiment of the present invention.
Figure 7:
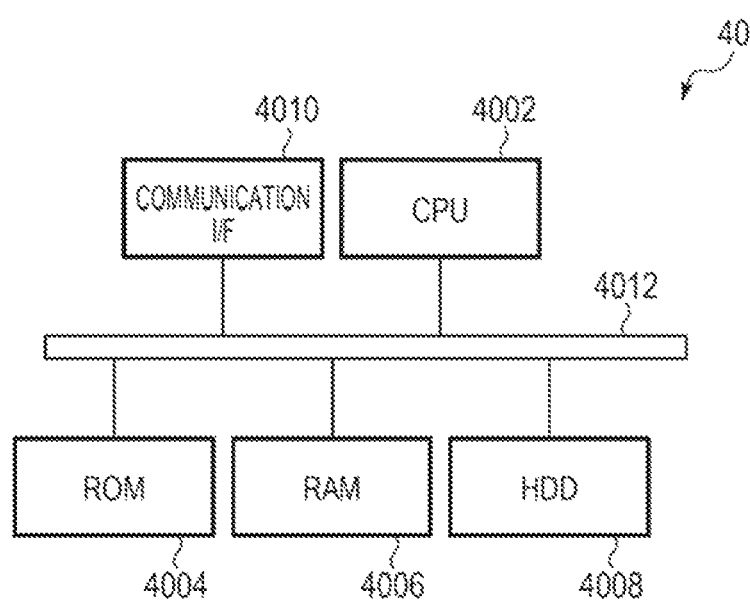
FIG. 7 is a block diagram illustrating an example of a hardware configuration of a datacenter server in the face recognition system according to the first example embodiment of the present invention.

First, the face recognition system according to the present example embodiment will be described by using FIG. 1 to FIG. 7. FIG. 1 is a schematic diagram illustrating a face recognition system according to the present example embodiment. FIG. 2 is a block diagram illustrating a functional configuration of the face recognition system according to the present example embodiment. FIG. 3 is a schematic diagram illustrating an example of an image captured by a fixed camera in the face recognition system according to the present example embodiment. FIG. 4 is a schematic diagram illustrating an example of various data for detected face images temporarily stored in a storage unit of a face matching apparatus in the face recognition system according to the present example embodiment. FIG. 5 is a schematic diagram illustrating an example of a process of N:1 matching in the face recognition system according to the present example embodiment. FIG. 6 is a block diagram illustrating an example of a hardware configuration of a face matching apparatus in the face recognition system according to the present example embodiment. FIG. 7 is a block diagram illustrating an example of a hardware configuration of a datacenter server in the face recognition system according to the present example embodiment.

The face recognition system according to the present example embodiment performs identity verification by using face matching at the entrance gate of a facility, where an authentication subject is a visitor who intends to enter the facility by using an admission ticket. For example, the facility may be a theme park, an event hall, a stadium, a concert hall, or the like. For example, a ticket used by a visitor is an admission ticket called an annual pass, an annual passport, or the like with which the visitor can enter the facility any times during a particular period such as a year or the like, although the type thereof is not limited in particular. The admission ticket may be a paper ticket or an electronic ticket as long as it is a medium in which identification information that identifies the admission ticket is recorded in a readable manner. A case of identity verification by using face matching when a visitor uses an annual pass to enter a facility will be described below.

As illustrated in FIG. 1 and FIG. 2, the face recognition system 1 according to the present example embodiment includes a gate apparatus 10, a fixed camera 20, a face matching apparatus 30, and a datacenter server 40. The gate apparatus 10, the fixed camera 20, and the face matching apparatus 30 are installed at an entrance gate 50 of a facility. On the other hand, the datacenter server 40 is installed within a datacenter located in a remote place of the entrance gate 50, for example.

At the entrance gate 50 where the gate apparatus 10 and the like are installed, a roof 502 is installed. A lighting apparatus 504 is provided to the roof. Further, a guide plate 508 indicating the entrance gate 50 is provided to the roof 502 so as to be located above the gate apparatus 10.

The face matching apparatus 30 and the datacenter server 40 are connected to a network via a network 60, respectively, and can be communicated with each other via the network 60. The network 60 may be a Wide Area Network (WAN) or a Local Area Network (LAN), for example, although the type thereof is not limited in particular.

Further, the gate apparatus 10 and the fixed camera 20 are directly, locally connected in a communicable manner to the face matching apparatus 30 through cable connection or the like, respectively. The connection among the gate apparatus 10, the fixed camera 20, and the face matching apparatus 30 may be of a wired scheme or a wireless scheme.

An annual pass can be purchased from a web ticket store or a ticket booth. A web server 70 that provides a web ticket store and a ticket booth terminal 80 are connected to the network 60. The web server 70 and the ticket booth terminal 80 can communicate with the datacenter server 40 via the network 60, respectively. The web server 70 is installed inside a datacenter located in a remote place of the entrance gate 50, for example. The ticket booth terminal 80 is installed inside the ticket booth neighboring the entrance gate 50, for example.

Next, each component of the face recognition system 1 according to the present example embodiment will be described in detail.

The gate apparatus 10 has a main unit 102, a fence 104, a gate 106, a reading unit 108, a hand camera 110, and a gate control unit 112.

The main unit 102 and the fence 104 are installed so as to face each other. A path 114 through which a visitor walks to enter the facility runs between the main unit 102 and the fence 104. On the path 114, an entrance 114*a* is outside, and an exit 114*b* is inside. The main unit 102 is installed on the right side when viewed from the entrance 114*a* to the exit 114*b* of the path 114. On the other hand, the fence 104 is installed on the left side when viewed from the entrance 114*a* to the exit 114*b* of the path 114.

The gate 106 is provided on the sidewall on the main unit 102 on the path 114 so as to block the path 114 during a standby state. When opened from a closed state during a standby state for blocking the path 114, the gate 106 allows a visitor to walk through the path 114 and enter the inside of the facility. The gate 106 is a turn-style gate in which three bars rotate, for example. Note that, without limited to the above, various types of gates may be used as a gate. For example, as the gate 106, a flapper gate in which two flappers provided on both sides or a single flapper provided on one side of the path 114 is opened and closed may be used.

As described later, the gate 106 is opened when identity verification by face matching is successful. Thereby, the visitor is allowed to walk through the path 114 and enter the inside of the facility.

Note that the gate 106 may be a gate that is in an opened state during a standby state and maintains the opened state when identity verification by face matching is successful, and is closed when identity verification by face matching is failed.

The reading unit 108 is provided on a portion on the entrance 114*a* side on the path 114 of the gate 106 on the top of the main unit 102. The reading unit 108 reads information recorded in an annual pass carried by a visitor from the annual pass. Specifically, in an annual pass, identification (ID) information that is identification information uniquely identifying the annual pass is recorded. The reading unit 108 reads ID information from an annual pass. The ID information read by the reading unit 108 may be a member number, a serial number, or the like of the annual pass, for example. An annual pass is a medium that is carried by a visitor who is an authentication subject and required when the visitor enters the inside of the facility and on which ID information uniquely identifying itself is recorded. Here, the medium may be a medium, such as a card, a sheet, a smartphone, or the like, which has information identifying an authentication subject. As described later, information on purchasers who have purchased the annual passes in association with ID information of the annual passes is accumulated in the datacenter server 40.

The reading unit 108 has a reading scheme in accordance with a recording scheme of ID information on an annual pass. For example, when an annual pass has ID information recorded in a one-dimensional code such as a barcode or a two-dimensional code such as a QR code (registered trademark), the reading unit 108 is a code reader such as a barcode reader, a QR code reader, or the like. Further, for example, when an annual pass has ID information recorded in a non-contact IC card or a non-contact IC tug using Radio Frequency Identification (RFID), the reading unit 108 is an RFID reader.

When there is ticket presentation of an annual pass at the reading unit 108, the reading unit 108 reads ID information recorded in the annual pass from the annual pass. Note that ticket presentation here means that a visitor who is an authentication subject causes the reading unit 108 to read information including the ID information recorded in an annual pass.

The reading unit 108 transmits ID information read from an annual pass to the gate control unit 112 described later. Note that identification information identifying an authentication subject is not limited to ID information stored in a medium such as an annual pass. The identification information identifying an authentication subject may include biometric information of an authentication subject such as a finger print, a vein, an iris, or the like, for example, and may be any information that can identify an authentication subject. In this case, the reading unit 108 may be a finger print scanner, a vain scanner, a camera, or the like that can read biometric information such as a finger print, a vein, an iris, or the like of an authentication subject.

The hand camera 110 is provided to a portion near the gate 106 on the top of the main unit 102. The hand camera 110 is a digital video camera, for example, and can capture a face image of a visitor who is an authentication subject and acquire the face image according to an operation of the staff of the facility. The hand camera is other image-capturing units used when face matching based on a face image captured by the fixed camera 20 is failed, as described later. Note that the hand camera 110 may be any camera as long as it can acquire a face image of a visitor and may be a digital still camera.

The hand camera 110 transmits image data of the captured face image of a visitor to the gate control unit 112 described later.

The gate control unit 112 controls the operation of the gate apparatus 10. The reading unit 108 is connected to the gate control unit 112 so as to be able to communicate therewith. Further, the gate 106 is connected to the gate control unit 112 in a controllable manner. Further, the hand camera 110 is connected to the gate control unit 112 so as to be able to communicate therewith.

ID information of an annual pass read by the reading unit 108 is transmitted to the gate control unit 112 from the reading unit 108. The gate control unit 112 transmits ID information of an annual pass transmitted from the reading unit 108 to the face matching apparatus 30.

Further, the gate control unit 112 controls opening and closing of the gate 106 based on a matching result signal transmitted from the face matching apparatus 30 described later.

Further, image data of a face image of a visitor captured by the hand camera 110 is transmitted to the gate control unit 112 from the hand camera 110. The gate control unit 112 transmits image data of a face image transmitted from the hand camera 110 to the face matching apparatus 30.

The fixed camera 20 is fixed to the upper end of a support pillar 202 installed inside the facility with respect to the gate apparatus 10. The fixed camera 20 is an image capturing unit that captures an image of an area in front of the gate apparatus 10 and in which the orientation facing the side of the outside of the facility is fixed. The fixed camera 20 is fixed at a height located above a head of a human of a height of around 200 cm, for example, from the ground face at the entrance gate 50 and is directed obliquely downward to face an area in front of the gate apparatus 10. Note that a fixing scheme of the fixed camera 20 is not limited to a scheme using the support pillar 202. For example, the fixed camera 20 may be hanged from and fixed to the roof 502 of the entrance gate 50.

The fixed camera 20 fixed as described above captures an image of an area in front of the gate apparatus 10 that is the entrance side to the installation area of the gate apparatus 10 including the reading unit 108. That is, the fixed camera 20 captures an image on the entrance side to the installation area of the reading unit 108. Thereby, the fixed camera 20 can capture a visitor V in an area in front of the gate apparatus 10 that is the entrance side to the installation area of the reading unit 108. Therefore, the fixed camera 20 can capture an image including an authentication subject.

The fixed camera 20 is a digital video camera, for example, and is able to capture a moving image at a predetermined framerate to continuously acquire a plurality of images at a predetermined cycle synchronized with the framerate. For example, the fixed camera 20 is able to capture a moving image at 15 fps and continuously acquire images of 15 frame per second.

Note that the fixed camera 20 may be a digital still camera. In this case, the fixed camera 20 can be configured to continuously capture static images at a predetermined capturing interval and continuously acquire a plurality of images at a predetermined cycle.

Further, the fixed camera 20 may be a visible light camera or an infrared camera. When the fixed camera 20 is an infrared camera, an infrared lighting apparatus 506 that emits an infrared may be provided to the roof 502 of the entrance gate 50 in addition to the normal lighting apparatus 504 that emits an illumination light including a visible light. By using an infrared camera as the fixed camera 20 under the infrared lighting apparatus 506, it is possible to perform face matching based on a face image captured by the fixed camera 20 while reducing the influence by the brightness nearby.

Further, the fixed camera 20 is installed in a vertical orientation so as to capture a vertically long image. This enables the fixed camera 20 to capture an image including a visitor's face of a wide range of heights from a short visitor to a tall visitor. Specifically, the fixed camera 20 can capture an image including a face of a visitor whose height ranges from 99 cm to 220 cm, for example. Note that the fixed camera 20 is not necessarily required to be installed vertically but may be installed horizontally so as to capture a horizontally long image.

Faces of a plurality of visitors in an area in front of the gate apparatus 10 may be included in an image captured by the fixed camera 20.

The fixed camera 20 transmits image data of a plurality of images acquired at a predetermined cycle as described above to the face matching apparatus 30 in synchronization with the cycle.

The face matching apparatus 30 has a face matching control unit 302, a storage unit 304, and a display unit 306.

The face matching control unit 302 performs face matching based on a face image captured by the fixed camera 20. The face matching control unit 302 includes an image data acquisition unit 308, a face detection unit 310, a face feature amount extraction unit 312, and a face matching unit 314.

The image data acquisition unit 308 sequentially acquires image data of images transmitted from the fixed camera 20 at a predetermined cycle. Note that the image data acquisition unit 308 can perform image processing such as a correction process on the acquired image data.

The face detection unit 310 performs face detection on respective images of image data sequentially acquired from the image data acquisition unit 308. Thereby, the face detection unit 310 detects a face image of a visitor in an area in front of the gate apparatus 10 as a detected face image out of images of image data sequentially acquired by the image data acquisition unit 308. As an algorithm used by the face detection unit 310 for face detection, without being limited in particular, various algorithms may be used.

FIG. 3 illustrates an example of one frame of image captured by the fixed camera 20. As illustrated in FIG. 3, a single visitor V1 in an area in front of the gate apparatus 10 is captured in one frame of image I. The face detection unit 310 detects a face image of the visitor V1 as illustrated by a rectangular detection frame 316 in FIG. 3 from the image I captured by the fixed camera 20 in such a way.

Note that a plurality of visitors in an area in front of the gate apparatus 10 may be captured in one frame of image captured by the fixed camera 20. Further, the same person may be captured in different frames of images captured by the fixed camera 20. These cases will be described later.

The face feature amount extraction unit 312 extracts a face feature amount that is a feature amount of a face image for respective face images detected by the face detection unit 310. Note that a face image detected by the face detection unit 310 may be referred to as a detected face image below. The face feature amount is a vector amount and obtained by combining scaler amount components expressing the feature of a face image. As a component of a feature amount, without being limited in particular, various types thereof may be used. For example, as a component of a feature amount, a positional relationship such as a distance or an angle between feature points that are set at the center or the end of an organ of a face, such as an eye, a nose, a mouth, or the like, a curvature of the outline of a face, a color distribution or a shade and light value of the surface of a face, or the like can be used. The number of components of the feature amount may be set as appropriate in accordance with required matching accuracy, a processing speed, or the like without being limited in particular.

Further, the face feature amount extraction unit 312 temporarily stores face image data that is image data of the detected face image together with the face feature amount extracted from the detected face image in the storage unit 304 in association with each other. Furthermore, the face feature amount extraction unit 312 temporarily stores a detection number that is a number identifying the image data and the capturing time when the detected face image is captured in the storage unit 304 in association with each other for respective detected face images, together with face image data and the face feature amount thereof.

A relational database is configured in the storage unit 304. In the relational database of the storage unit 304, the face feature amount extracted by the face feature amount extraction unit 312 as described above is temporarily stored in association with a detection number, a capturing time, and face image data. Such mutually associated data is managed by a Relational Database Management System (RDBMS). As an RDBMS, without being limited in particular, Microsoft (registered trademark) SQL Server is used, for example.

FIG. 4 is a schematic diagram illustrating an example of various data for detected face images temporarily stored in the storage unit 304 by the face feature amount extraction unit 312. As illustrated in FIG. 4, a detection number, a capturing time, face image data, and a face feature amount are associated with each other and temporarily stored in the storage unit 304 for respective detected face images.

In the storage unit 304, the face feature amount and data related thereto are stored for only a certain period from the capturing time for each detected face image. The face feature amount and data related thereto of a detected face image remaining after a certain time has elapsed from the capturing time are sequentially deleted from the relational database of the storage unit 304. For example, the face feature amount and data related thereto of the detected face image captured by the fixed camera 20 within the immediate past three minutes are temporarily stored in the storage unit 304.

When there is ticket presentation of an annual pass to the reading unit 108 of the gate apparatus 10, the face matching unit 314 performs identity verification by face matching for the visitor who performs ticket presentation of an annual pass at the reading unit 108.

ID information read by the reading unit 108 from the annual pass on the ticket presentation is transmitted to the face matching unit 314. The face matching unit 314 acquires the transmitted ID information and acquires, online, a face feature amount of a registered face image which is registered in association with the ID information via the network 60 from the datacenter server 40 described later. A person of the registered face image acquired by the face matching unit 314 as above is a valid user who can validly use the annual pass on the ticket presentation. A valid user of an annual pass is a purchaser who has purchased the annual pass, for example.

Further, the face matching unit 314 refers to the relational database of the storage unit 304 and acquires, offline, face feature amounts of N detected face images associated with the capturing time included in a predetermined period before ticket presentation that is before acquisition of ID information. That is, the face matching unit 314 acquires face feature amounts of N detected face images captured by the fixed camera 20 before the reading unit 108 reads ID information from an annual pass. Note that N is typically an integer greater than one, and a plurality of detected face images are acquired by the face matching unit 314. However, there may be a case where N is one and a single detected face image is acquired by the face matching unit 314. A predetermined period before ticket presentation is performed for acquiring a detected face image may be a period immediately before the ticket presentation, and the length thereof may be set as appropriate in accordance with required matching accuracy, a processing speed, or the like. For example, a predetermined period before ticket presentation for acquiring a detected face image can be set to several seconds immediately before the ticket presentation.

The face matching unit 314 performs a matching process that sequentially matches respective face feature amounts of N detected face images, which have been captured before ticket presentation of an annual pass, against a face feature amount of a registered face image. The matching process here is referred to as N:1 matching because matching of the maximum N detected face images against one registered face image is performed. As discussed above, the face matching unit 314 matches detected face images, which have been detected by the face detection unit 310 from images captured before acquisition of ID information, against a registered face image corresponding to the acquired ID information.

The face matching unit 314 calculates a matching score in accordance with a similarity between a face feature amount of a detected face image and a face feature amount of a registered face image in N:1 matching. The matching score is a larger value for a higher similarity between the face feature amount of a detected face image and the face feature amount of a registered face image. As a result of matching for a certain detected face image, the face matching unit 314 determines that the matching is unmatched if the matching score is less than a predetermined threshold and performs matching of the face feature amount of the next detected face image with the face feature amount of the registered face image. On the other hand, as a result of matching for a certain detected face image, the face matching unit 314 determines that the matching is matched if the matching score is greater than or equal to the predetermined threshold and completes the matching process.

The order of performing matching of face feature amounts against a registered face image for N detected face images is not limited in particular. For example, for N detected face images, matching of face feature amounts against a registered face image may be performed in ascending order or descending order of capturing time or at random. Further, a priority may be determined for each of the N detected face images, and the order of performing matching of face feature amounts against a registered face image may be determined based on the priority. Note that the case where the order of performing matching of face feature amounts against a registered face image is determined based on the priority will be described in a second embodiment.

FIG. 5 is a schematic diagram illustrating an example of a process of N:1 matching performed by the face matching unit 314 in the present example embodiment. As illustrated in FIG. 5, face feature amounts of N detected face images captured in a predetermined period before ticket presentation are sequentially matched against a face feature amount of a registered face image registered in association with ID information of an annual pass on the ticket presentation. The order of performing matching of face feature amounts against a registered face image for N detected face images may be ascending order of capturing time, for example.

If the matching performed by the face matching unit 314 is matched, this means that a valid user of an annual pass on the ticket presentation has been included in visitors in front of the gate apparatus 10 before the ticket presentation. Thus, it can be estimated that a valid user of an annual pass performs the ticket presentation of the annual pass. Therefore, in this case, identity verification by face matching is successful.

On the other hand, if all the matching performed by the face matching unit 314 is unmatched, no valid user of an annual pass on the ticket presentation has been included in visitors in front of the gate apparatus 10 before the ticket presentation. Therefore, in this case, identity verification by face matching is failed.

A matching result or the like by the face matching unit 314 can be displayed on the display unit 306. The staff of the facility can confirm a matching result or the like by viewing the display on the display unit 306.

The face matching unit 314 transmits a matching result signal that is a signal indicating the matching result described above to the gate apparatus 10. Specifically, the face matching unit 314 transmits, to the gate apparatus 10, a matching-matched signal that is a signal indicating that the matching by the face matching unit 314 is matched or a matching-unmatched signal that is a signal indicating that all the matching performed by the face matching unit 314 is unmatched.

The face matching apparatus 30 described above is formed of a computer apparatus, for example. An example of a hardware configuration of the face matching apparatus 30 will be described by using FIG. 6. Note that the face matching apparatus 30 may be formed of a single device or may be formed of two or more physically separated devices in wired connection or wireless connection.

As illustrated in FIG. 6, the face matching apparatus 30 has a central processing unit (CPU) 3002, a read only memory (ROM) 3004, a random access memory (RAM) 3006, and a hard disk drive (HDD) 3008. Further, the face matching apparatus 30 has a communication interface (I/F) 3010. Further, the face matching apparatus 30 has a display controller 3012 and the display 3014. Furthermore, the face matching apparatus 30 has an input device 3016. The CPU 3002, the ROM 3004, the RAM 3006, the HDD 3008, the communication I/F 3010, the display controller 3012, and the input device 3016 are connected to a common bus line 3018.

The CPU 3002 controls the entire operation of the face matching apparatus 30. Further, the CPU 3002 executes a program that implements the function of each unit of the image data acquisition unit 308, the face detection unit 310, the face feature amount extraction unit 312, and the face matching unit 314 in the face matching control unit 302 described above. The CPU 3002 loads a program stored in the HDD 3008 or the like to the RAM 3006 to implement the function of each unit of the face matching control unit 302.

The ROM 3004 stores a program such as a boot program therein. The RAM 3006 is used as a working area when the CPU 3002 executes a program. Further, the program executed by the CPU 3002 is stored in the HDD 3008.

Further, the HDD 3008 is a storage device that implements the function of the storage unit 304 described above.

Note that a storage device that implements the function of the storage unit 304 is not limited to the HDD 3008. Various storage devices can be used for implementing the function of the storage unit 304.

The communication I/F 3010 is connected to the network 60. The communication I/F 3010 controls data communication with the datacenter server 40 connected to the network 60.

The display controller 3012 is connected to the display 3014 that functions as the display unit 306. The display controller 3012 causes a matching result from the face matching unit 314 to be displayed on the display 3014.

The input device 3016 may be a keyboard, a mouse, or the like, for example. Further, the input device 3016 may be a touch panel embedded in the display 3014. The staff of the facility can perform setting of the face matching apparatus 30 or input an instruction of execution of a process via the input device 3016.

Note that the hardware configuration of the face matching apparatus 30 is not limited to the configuration described above, but may be various configurations.

The gate control unit 112 of the gate apparatus 10 controls opening and closing of the gate 106 based on a matching result signal transmitted from the face matching unit 314. That is, the gate control unit 112 opens the gate 106 when a matching-matched signal is transmitted from the face matching unit 314. Thereby, a visitor performing ticket presentation is allowed to walk through the path 114 of the gate apparatus 10 to enter the inside of the facility as a person who has been successful in identity verification. The gate control unit 112 causes the gate 106 to be closed after the visitor walked through the path 114.

On the other hand, the gate control unit 112 maintains a closed state of the gate 106 when a matching-unmatched signal is transmitted from the face matching unit 314. At this time, the gate control unit 112 can sound an alert sound of a not-shown alarm provided to the gate apparatus 10, turn on an alert light, or the like to output a warning indicating that all the matching results are unmatched.

The datacenter server 40 has a control unit 402 and a storage unit 404.

The control unit 402 controls the operation of the datacenter server 40.

The storage unit 404 accumulates registered face images and face feature amounts thereof that are registered in association with ID information of issued annual passes.

The control unit 402 provides, to the face matching unit 314, a face feature amount of a registered face image registered in association with ID information of an annual pass on ticket presentation in response to a request from the face matching unit 314.

A registered face image can be uploaded on the web server 70 from a purchaser's terminal when an annual pass is purchased at a web store provided by the web server 70. The registered face image uploaded to the web server 70 is transmitted from the web server 70 to the datacenter server 40. In the datacenter server 40 to which the registered face image has been transmitted, the control unit 402 accumulates the transmitted registered face image in the storage unit 404.

Further, a purchaser who purchased an annual pass at a ticket booth can capture his/her registration face image by the hand camera 110 of the gate apparatus 10 when first visiting the facility. The registered face image captured by the hand camera 110 is transmitted to the datacenter server 40 via the network 60 by the face matching apparatus 30 and accumulated in the storage unit 404 thereof.

Further, a purchaser who purchased an annual pass at a ticket booth may soon capture his/her registration face image by a hand camera (not shown) of the ticket booth. The registered face image captured by the hand camera of the thicket booth is transmitted to the datacenter server 40 via the network 60 by the ticket booth terminal 80 and accumulated in the storage unit 404 thereof.

For a registered face image accumulated in the storage unit 404 of the datacenter server 40 as described above, the same face feature amount as the face feature amount extracted by the face feature amount extraction unit 312 of the face matching apparatus 30 is extracted. Extraction of a face feature amount is performed by the control unit 402 that functions as a face feature amount extraction unit. The extracted face feature amount is accumulated in the storage unit 404 by the control unit 402 in association with ID information of the annual pass with which the registered face image is associated.

A relational database is configured in the storage unit 404. In the relational database of the storage unit 404, face feature amounts of registered face images are stored in association with ID information of annual passes and face image data of the registered face images, as described above. Such mutually associated data is managed by an RDBMS. As an RDBMS, without being limited in particular, Microsoft (registered trademark) SQL Server is used, for example.

Note that, in the relational database of the storage unit 404, in addition to the above, pieces of information such as names, contact addresses, or the like of purchasers of annual passes who are valid users of the annual passes are stored in association with ID information of the annual passes, for example.

The datacenter server 40 described above is formed of a computer apparatus, for example. An example of a hardware configuration of the datacenter server 40 will be described by using FIG. 7. Note that the datacenter server 40 may be formed of a single device or may be formed of two or more physically separated devices by wired connection or wireless connection.

As illustrated in FIG. 7, the datacenter server 40 has a CPU 4002, a ROM 4004, a RAM 4006, and an HDD 4008. Further, the datacenter server 40 has a communication I/F 4010. The CPU 4002, the ROM 4004, the RAM 4006, the HDD 4008, and the communication I/F 4010 are connected to a common bus line 4012.

The CPU 4002 controls the entire operation of the datacenter server 40. Further, the CPU 4002 executes a program that implements the function of the control unit 402 described above. The CPU 4002 loads a program stored in the HDD 4008 or the like to the RAM 4006 to implement the function of the control unit 402.

The ROM 4004 stores a program such as a boot program therein. The RAM 4006 is used as a working area when the CPU 4002 executes a program. Further, the program executed by the CPU 4002 is stored in the HDD 4008.

Further, the HDD 4008 is a storage device that implements the function of the storage unit 404 described above. Note that a storage device that implements the function of the storage unit 404 is not limited to the HDD 4008. Various storage devices can be used for implementing the function of the storage unit 404.

The communication I/F 4010 is connected to the network 60. The communication I/F 4010 controls data communication with the face matching apparatus 30 connected to the network 60.

Note that the hardware configuration of the datacenter server 40 is not limited to the configuration described above, but may be various configurations.

As described above, the face recognition system 1 according to the present example embodiment matches a detected face image captured by the fixed camera 20 before ticket presentation, in which the reading unit 108 reads ID information from an annual pass is performed, against a registered face image registered in association with ID information of the annual pass on the ticket presentation. That is, in the face recognition system 1 according to the present example embodiment, a detected face image that is an image of a matching subject to be matched against a registered face image is acquired in advance before ticket presentation of an annual pass.

Thus, according to the present example embodiment, after a visitor performs ticket presentation of an annual pass, it is not necessary for the staff of the facility to capture a face image of the visitor as an image of a matching subject to be matched against a registered face image. Further, a visitor neither needs to concern about capturing of the face image thereof nor needs to perform a special move such as positioning of the face thereof for the capturing. Therefore, according to the present example embodiment, face matching can be made smoothly in a short time.

Figure 8:
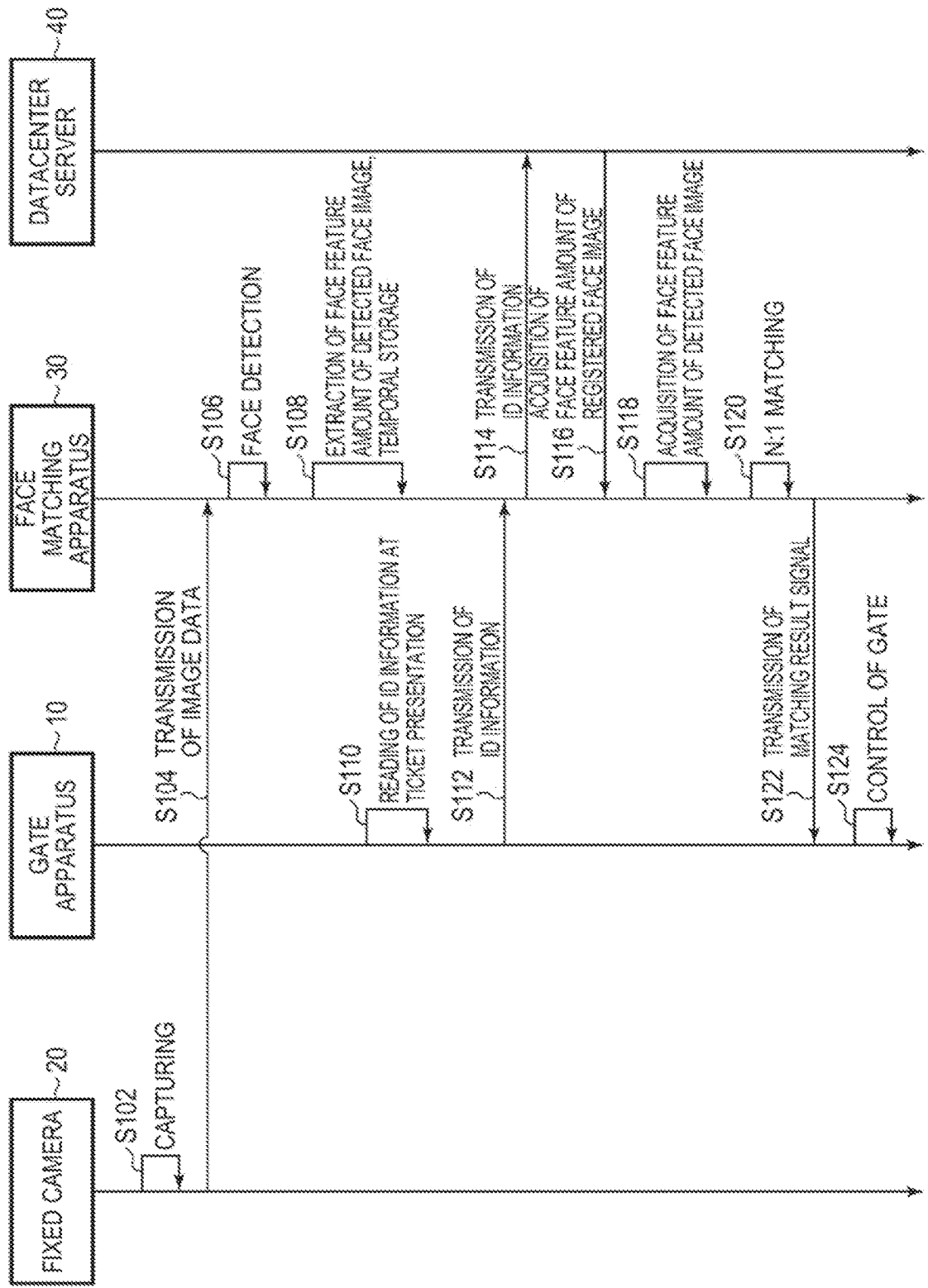
FIG. 8 is a sequence diagram illustrating a face recognition method according to the first example embodiment of the present invention.
Figure 9:
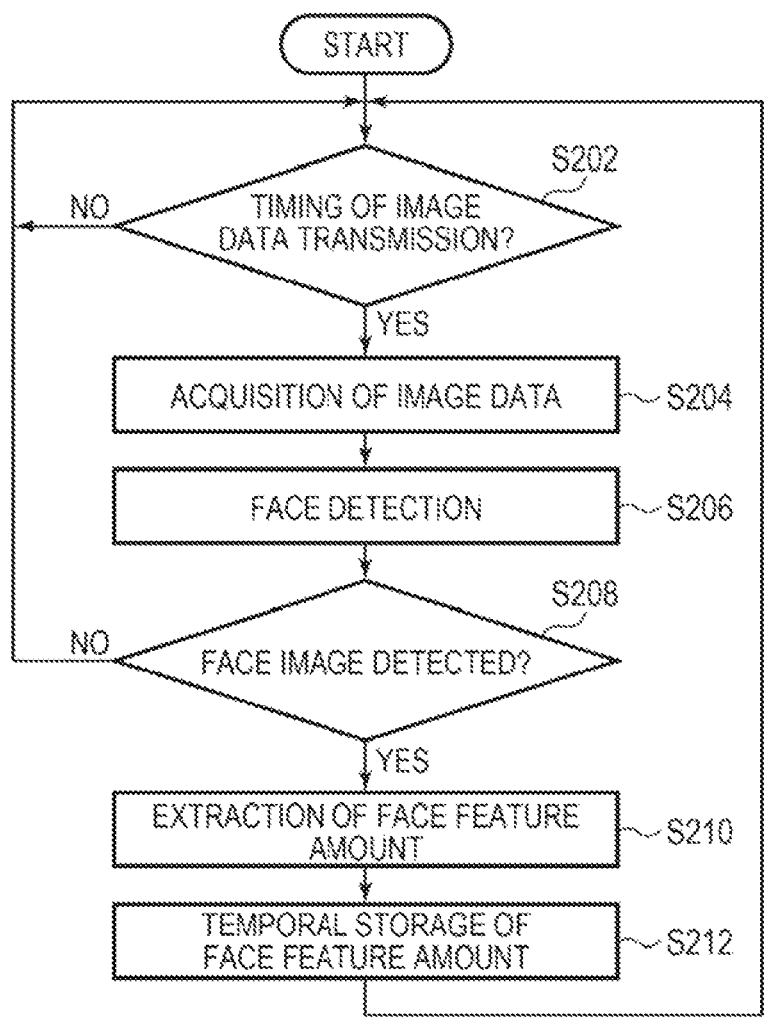
FIG. 9 is a flowchart (part 1) illustrating the face recognition method according to the first example embodiment of the present invention.
Figure 10:
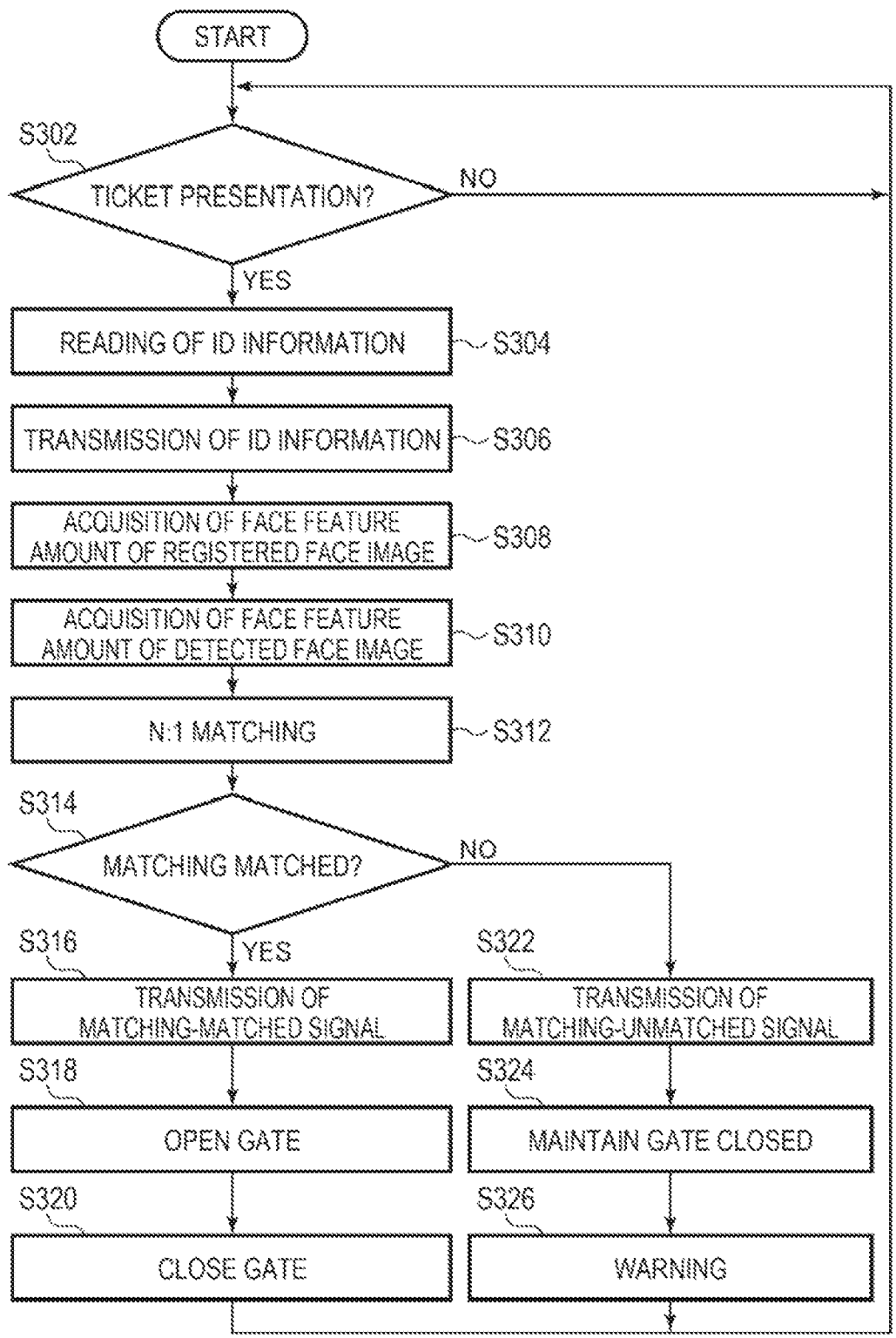
FIG. 10 is a flowchart (part 2) illustrating the face recognition method according to the first example embodiment of the present invention.

Next, a face recognition method according to the present example embodiment using the face recognition system 1 according to the above present example embodiment will be further described by using FIG. 8 to FIG. 10.

First, the entire flow of the face recognition method according to the present example embodiment will be described by using FIG. 8. FIG. 8 is a sequence diagram illustrating the face recognition method according to the present example embodiment.

The fixed camera 20 captures an area in front of the gate apparatus 10 that is the entrance side to the installation area of the reading unit 108 and continuously acquires a plurality of images at a predetermined cycle (step S102). Further, the fixed camera 20 transmits image data of the plurality of images acquired at a predetermined cycle to the face matching apparatus 30 in synchronization with the cycle (step S104).

In the face matching apparatus 30 to which the image data has been transmitted, the image data acquisition unit 308 sequentially acquires image data transmitted from the fixed camera 20. The face detection unit 310 performs face detection for each image and detects a face image as a detected face image (step S106). The face feature amount extraction unit 312 extracts a face feature amount for each detected face image for temporary storage (step S108).

In the fixed camera 20 and the face matching apparatus 30, steps S102 to S108 described above are repeatedly performed.

On the other hand, when there is ticket presentation of an annual pass at the gate apparatus 10, the reading unit 108 reads ID information of the annual pass on the ticket presentation (step S110). Subsequently, the gate control unit 112 transmits ID information read by the reading unit 108 to the face matching apparatus 30 (step S112).

In the face matching apparatus 30 to which the ID information has been transmitted, the face matching unit 314 transmits the ID information to the datacenter server 40 via the network 60 (step S114) and requests a face feature amount of a registered face image registered in association with the ID information. Thereby, the face matching unit 314 acquires a face feature amount of a registered face image registered in association with the ID information online from the datacenter server 40 via the network 60 (step S116).

Further, the face matching unit 314 refers to a relational database of the storage unit 304 thereof and acquires, offline, face feature amounts of N detected face images associated with the capturing time included in a predetermined period before the ticket presentation (step S118). That is, the face matching unit 314 acquires face feature amounts of N detected face images captured before the reading unit 108 reads ID information from the annual pass.

Note that any one of the above step S116 and step S118 may be performed earlier or both of the above step S116 and step S118 may be performed at the same time.

Next, the face matching unit 314 performs N:1 matching based on the face feature amounts of the acquired detected face images and the face feature amount of the registered face image (step S120).

The face matching unit 314 that has performed N:1 matching transmits a matching result signal indicating a matching result to the gate apparatus 10 (step S122).

In the gate apparatus 10 to which the matching result signal has been transmitted, the gate control unit 112 controls opening and closing of the gate 106 based on the matching result signal (step S124).

Every time ticket presentation of an annual pass is performed at the reading unit 108 of the gate apparatus 10, steps S110 to S124 are repeatedly performed.

Next, details of the process in the face recognition method according to the present example embodiment will be described by using FIG. 9 and FIG. 10. FIG. 9 and FIG. 10 are flowcharts illustrating the face recognition method according to the present example embodiment, respectively.

First, a process from capturing by the fixed camera 20 to temporary storage of a face feature amount of a detected face image will be described in detail by using FIG. 9.

The image data of images captured by the fixed camera 20 is periodically transmitted to the face matching apparatus 30. The image data acquisition unit 308 determines whether or not it is the timing of transmission of image data from the fixed camera 20 (step S202). If it is not the timing of transmission of image data (step S202, NO), the image data acquisition unit 308 stands by for an arrival of the timing.

If it is the timing of transmission of image data from the fixed camera 20 (step S202, YES), the image data acquisition unit 308 acquires image data transmitted from the fixed camera 20 (step S204). Before the next step S206, the image data acquisition unit 308 can perform image processing such as a correction process on the acquired image data.

Next, the face detection unit 310 performs face detection on an image of image data acquired by the image data acquisition unit 308 and, from the image, detects a face image of a visitor in the area in front of the gate apparatus 10 (step S206). If no face image is detected (step S208, NO), the process returns to step S202 and stands by for transmission of next image data from the fixed camera 20.

If a face image is detected by the face detection unit 310 (step S208, YES), the face feature amount extraction unit 312 extracts a face feature amount for a detected face image that is the detected face image (step S210).

Further, the face feature amount extraction unit 312 temporarily stores the face image data of the detected face image together with the face feature amount extracted from the detected face image in the storage unit 304 in association with each other (step S212). At this time, the face feature amount extraction unit 312 temporarily stores a detection number that is a number identifying the image data and the capturing time when the detected face image is captured in the storage unit 304 in association with each other for the detected face image, together with face image data and the face feature amount thereof.

The process illustrated in FIG. 9 described above is repeatedly performed every time the timing of transmission of image data from the fixed camera 20 arrives during the operation of the face recognition system 1 according to the present example embodiment.

Next, a process from ticket presentation of an annual pass to gate control will be described by using FIG. 10.

In the gate apparatus 10, the reading unit 108 stands by until ticket presentation of an annual pass is performed (step S302, NO). During standby for ticket presentation, the gate 106 is closed.

In response to ticket presentation of an annual pass by a visitor at the reading unit 108 (step S302, YES), the reading unit 108 reads ID information recorded in the annual pass from the annual pass (step S306).

Subsequently, the gate control unit 112 transmits the ID information read by the reading unit 108 to the face matching apparatus 30 (step S306).

In the face matching apparatus 30, the face matching unit 314 transmits, to the datacenter server 40 via the network 60, the ID information transmitted from the gate control unit 112 and requests for a face feature amount of a registered face image. Thereby, the face matching unit 314 acquires, online, from the datacenter server 40 via the network 60, a face feature amount of a registered face image registered in association with the transmitted ID information (step S308).

Further, the face matching unit 314 refers to a relational database of the storage unit 304 to acquire, offline, face feature amounts of N detected face images associated with the capturing time included in a predetermined period before ticket presentation of an annual pass (step S310).

The face matching unit 314 performs N:1 matching that sequentially matches respective face feature amounts of the acquired N detected face images against the face feature amount of the acquired registered face image (step S312). If the matching score is less than a predetermined threshold as a result of matching for a certain detected face image, the face matching unit 314 determines that the matching is unmatched and performs matching of the face feature amount of the next detected face image with the face feature amount of the registered face image. On the other hand, if the matching score is greater than or equal to the predetermined threshold as a result of matching for the certain detected face image, the face matching unit 314 determines that the matching is matched and completes the matching process.

If the matching performed by the face matching unit 314 is matched (step S314, YES), the face matching unit 314 transmits a matching-matched signal indicating that the matching performed by the face matching unit 314 is matched to the gate apparatus 10 (step S316).

In the gate apparatus 10, in response to transmission of a matching-matched signal from the face matching unit 314, the gate control unit 112 opens the gate 106 (step S318). Thereby, the visitor performing ticket presentation is allowed to walk through 114 of the gate apparatus 10 and enter the inside of the facility as a person who is successful in identity verification.

The gate control unit 112 closes the gate 106 after the visitor has passed through the path 114 (step S320).

On the other hand, if all the matching performed by the face matching unit 314 is unmatched (step S314, NO), the face matching unit 314 transmits a matching-unmatched signal indicating that all the matching performed by the face matching unit 314 is unmatched to the gate apparatus 10 (step S322).

In the gate apparatus 10, in response to transmission of a matching-unmatched signal from the face matching unit 314, the gate control unit 112 maintains the closed state of the gate 106 (step S324). At this time, the gate control unit 112 outputs a warning by sounding an alert sound of a not-shown alert provided to the gate apparatus 10, turning on an alert light, or the like (step S326). As a result, the visitor performing ticket presentation is unable to enter the inside of the facility at this stage as a person who is failed in identity verification. In this case, an action such as identity verification again performed by the staff of the facility is made, for example.

The process illustrated in FIG. 10 described above is repeatedly performed every time ticket presentation is made at the reading unit 108 of the gate apparatus 10 during the face recognition method according to the present example embodiment being performed.

As discussed above, according to the present example embodiment, a face feature amount of a detected face image detected from an image captured by the fixed camera 20 before ticket presentation of an annual pass is performed is matched against a face feature amount of a registered face image registered in association with ID information of the annual pass on the ticket presentation. Therefore, according to the present example embodiment, face matching can be performed smoothly in a short time.

Note that, while the case where a single visitor is captured in one frame of image captured by the fixed camera 20 as illustrated in FIG. 3 has been described above as an example, a plurality of visitors may be captured in one frame of image captured by the fixed camera 20.

Figure 11:
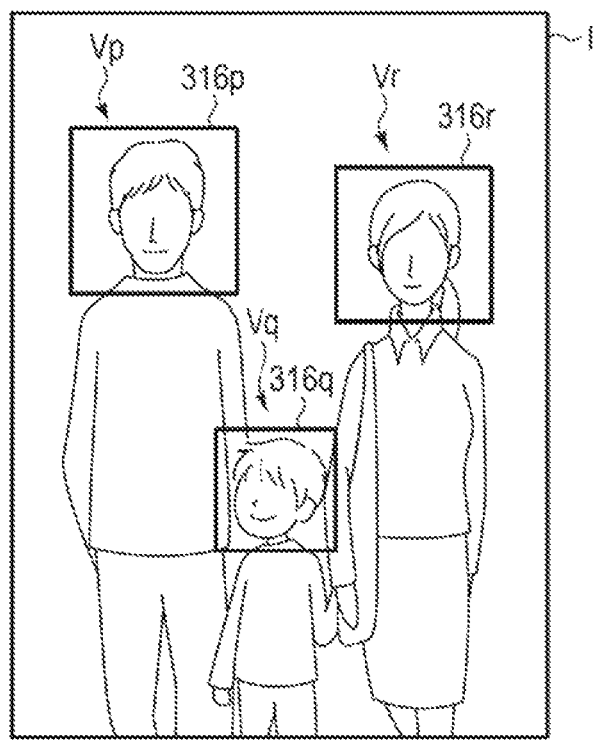
FIG. 11 is a schematic diagram illustrating another example of an image captured by a fixed camera in the face recognition system according to the first example embodiment of the present invention.

FIG. 11 illustrates another example of one frame of image captured by the fixed camera 20. As illustrated in FIG. 11, in one frame of image I, three visitors Vp, Vq, and Vr are captured in an area in front of the gate apparatus 10. In this way, a plurality of visitors may be captured in one frame of image I captured by the fixed camera 20. In such a case, the face detection unit 310 detects respective face images of the plurality of visitors Vp, Vq, and Vr from the image I captured by the fixed camera 20 as indicated by detection frames 316*p*, 316*q*, and 316*r* in FIG. 11. The plurality of detected face images detected from one frame of image in such a way are processed as an image of a matching subject to be matched against the registered face image, respectively, in the same manner as described above.

Second Example Embodiment

Figure 12:
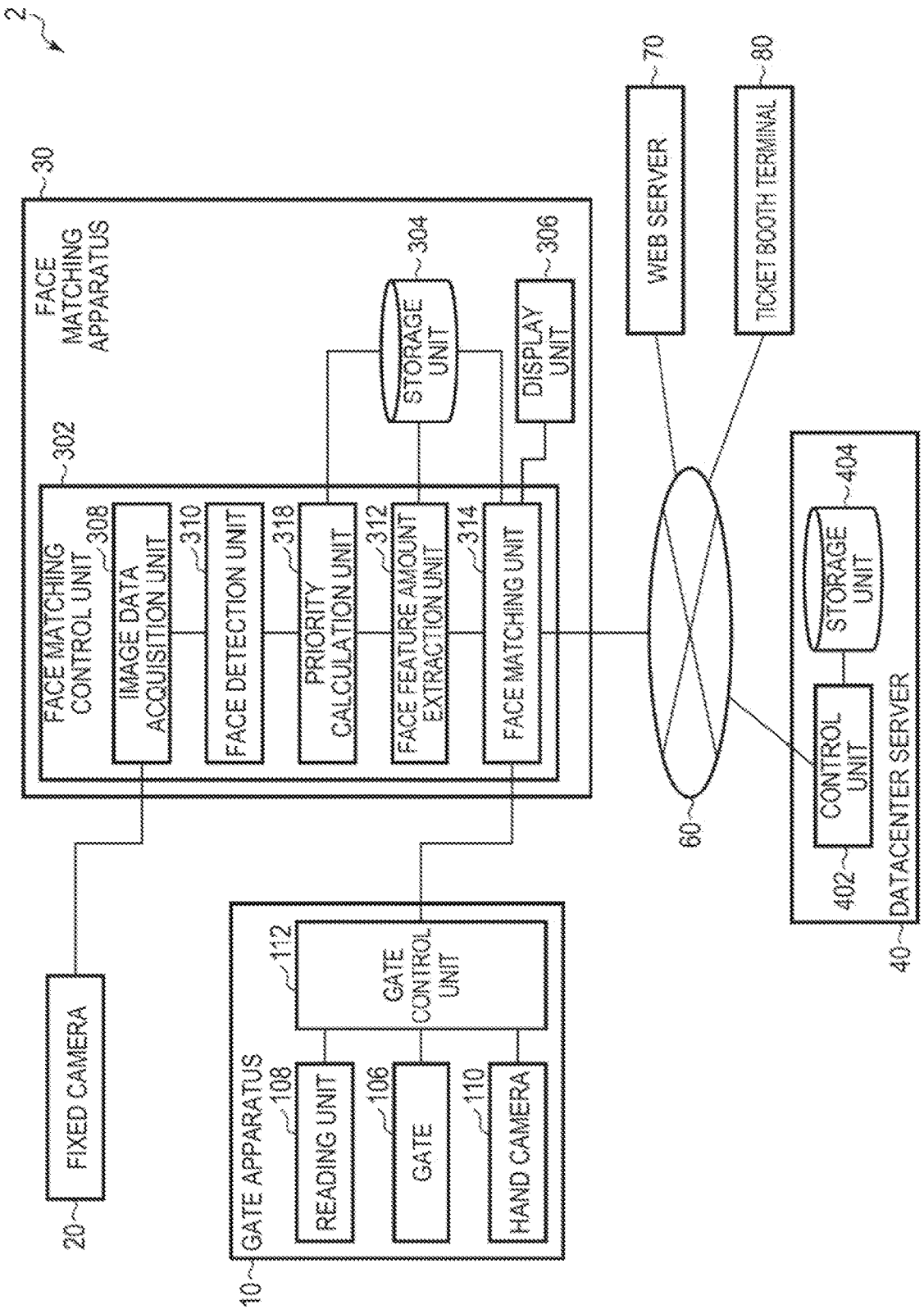
FIG. 12 is a block diagram illustrating a functional configuration of a face recognition system according to a second example embodiment of the present invention.
Figure 13:
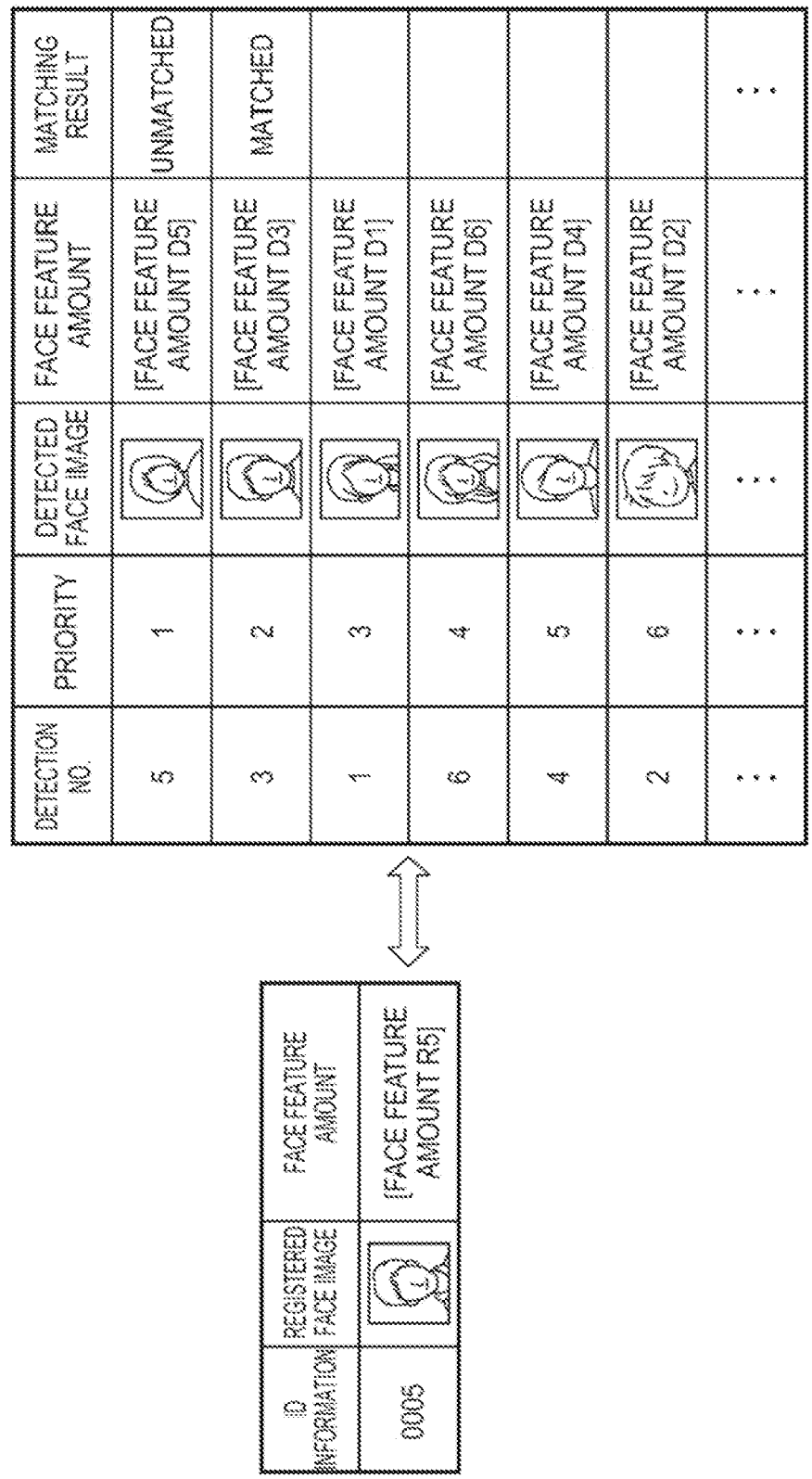
FIG. 13 is a schematic diagram illustrating an example of a process of N:1 matching in the face recognition system according to the second example embodiment of the present invention.

A face recognition system and a face recognition method according to a second example embodiment of the present invention will be described by using FIG. 12 and FIG. 13. FIG. 12 is a block diagram illustrating a functional configuration of a face recognition system according to the present example embodiment. FIG. 13 is a schematic diagram illustrating an example of a process of N:1 matching in the face recognition system according to the present example embodiment. Note that components similar to those in the face recognition system and the face recognition method according to the first example embodiment described above will be labeled with the same reference numeral, and the description thereof will be omitted or simplified.

The basic configuration of the face recognition system according to the present example embodiment is substantially the same as the configuration of the face recognition system according to the first example embodiment. The face recognition system according to the present example embodiment is different from the face recognition system according to the first example embodiment in that the face matching apparatus 30 further has a priority calculation unit that calculates the priority in performing N:1 matching for a detected face image.

As illustrated in FIG. 12, in a face recognition system 2 according to the present example embodiment, the face matching control unit 302 of the face matching apparatus 30 further has a priority calculation unit 318.

The priority calculation unit 318 calculates a priority used for determining the order of performing matching of a face feature amount against a registered face image for respective detected face images detected by the face detection unit 310. The priority calculation unit 318 can calculate a priority based on various factors.

As a factor by which the priority calculation unit 318 calculates a priority, a positional relationship of detected face images in an image captured by the fixed camera 20 is exemplified. A person of a detected face image located closer to the reading unit 108 of the gate apparatus 10 in an image captured by the fixed camera 20 is more likely to perform ticket presentation of an annual pass at the reading unit 108. Therefore, a higher priority can be set for a detected face image located closer to the reading unit 108 in an image captured by the fixed camera 20.

Further, as a factor by which the priority calculation unit 318 calculates a priority, a facial likeness score that is an evaluation value evaluating a facial likeness of a detected face image can be exemplified. For example, a facial likeness score having a higher value indicates that a detected face image is more likely to be a face. Therefore, a higher priority can be set for a detected face image having a higher facial likeness score.

Further, as a factor by which the priority calculation unit 318 calculates the priority, a quality of a detected face image is exemplified. A higher quality of a detected face image enables a more accurate matching. Therefore, a higher priority can be set for a detected face image having a higher quality.

The priority calculation unit 318 can calculates the priority based on any of the factors described above or a combination of these factors. For example, the priority value may be a smaller value for a higher priority.

The priority calculation unit 318 stores the calculated priorities for respective detected face images in the relational database configured in the storage unit 304 in association with a detection number, a capturing time, and face image data.

Note that, also in the present example embodiment, the face matching apparatus 30 can have the same hardware configuration as the hardware configuration illustrated in FIG. 6. In this case, the CPU 3002 executes a program implementing the function of the priority calculation unit 318.

FIG. 13 is a schematic diagram illustrating an example of a process of N:1 matching performed by the face matching unit 314 in the present example embodiment. As illustrated in FIG. 13, sequentially in descending order of priority, the face matching unit 314 matches the face feature amounts of N detected face images, which have been captured in a predetermined period before ticket presentation of an annual pass, against a face feature amount of a registered face image registered in association with ID information of the annual pass on the ticket presentation.

As discussed above, in the present example embodiment, since the order of performing matching of a face feature amount against a registered face image for N detected face images is descending order of priority, the N:1 matching can be efficiently performed. Therefore, according to the present example embodiment, face matching can be performed smoothly in a short time.

Third Example Embodiment

Figure 14A:
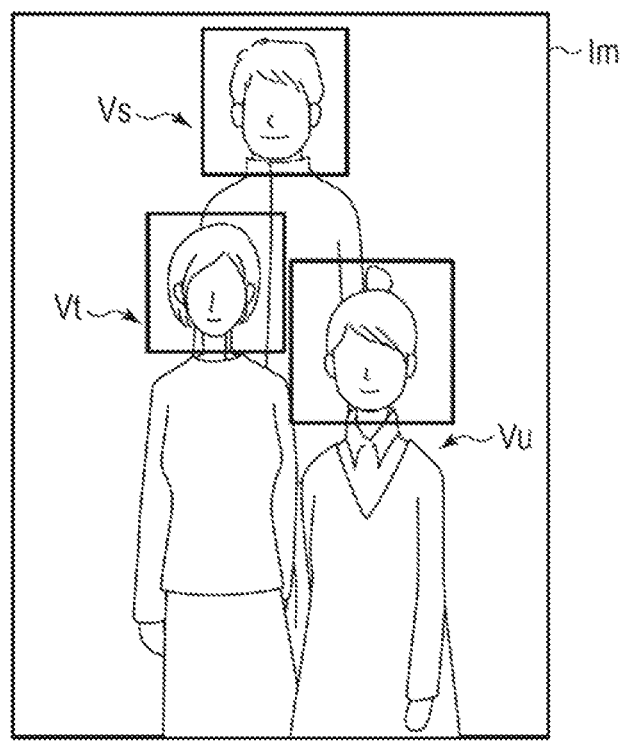
FIG. 14A is a schematic diagram illustrating an example of a different image captured by a fixed camera in a face recognition system according to a third example embodiment of the present invention.
Figure 14B:
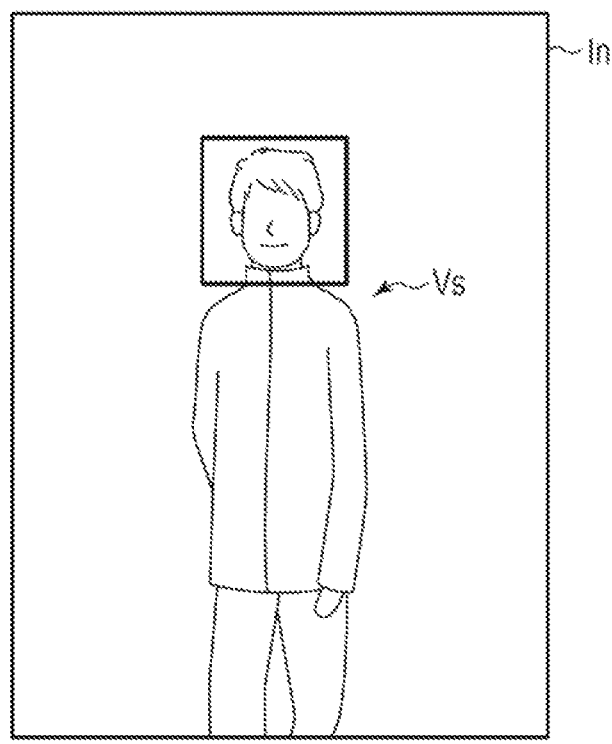
FIG. 14B is a schematic diagram illustrating an example of a different image captured by a fixed camera in the face recognition system according to the third example embodiment of the present invention.
Figure 15:
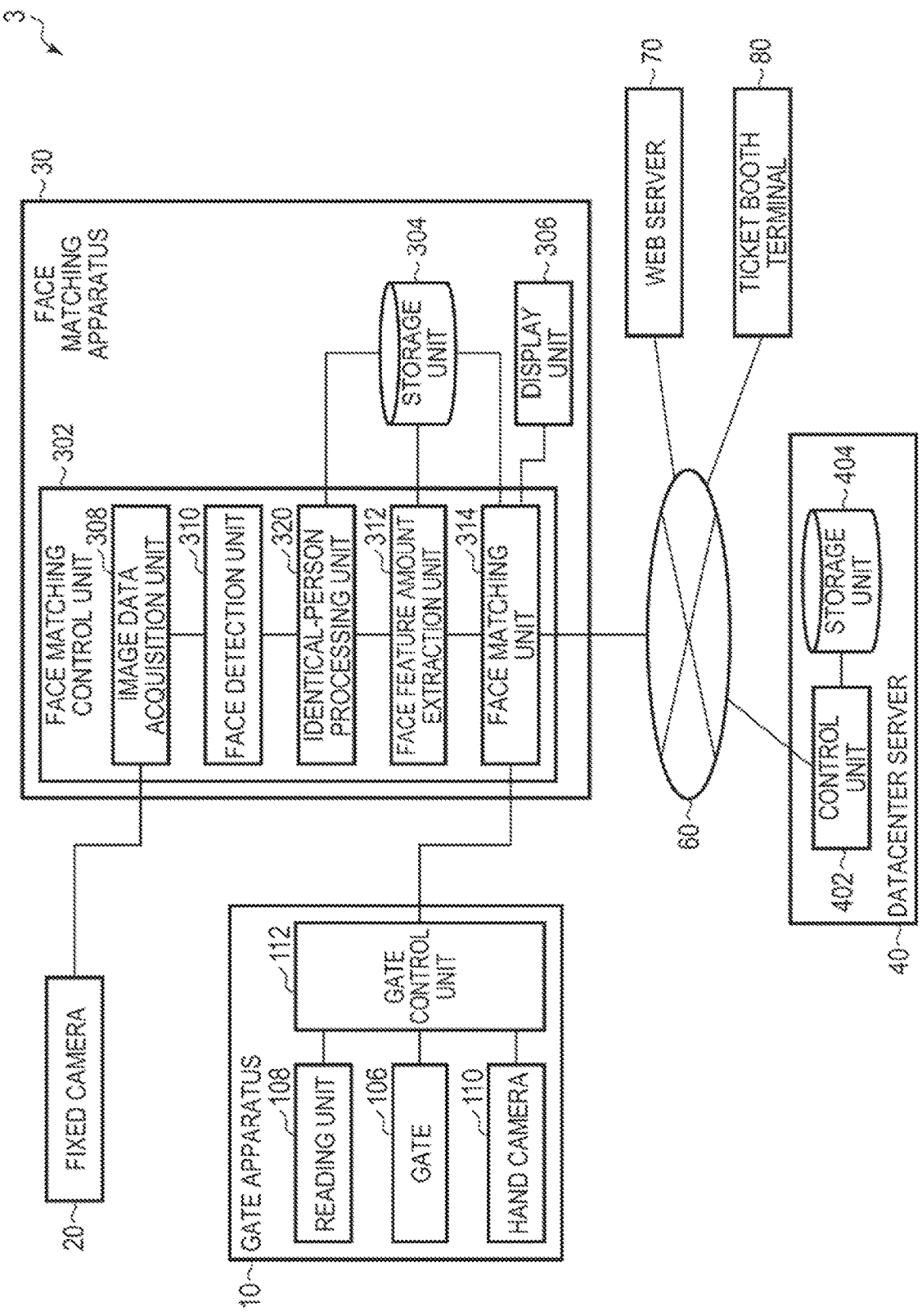
FIG. 15 is a block diagram illustrating a functional configuration of a face recognition system according to the third example embodiment of the present invention.

A face recognition system and a face recognition method according to a third example embodiment of the present invention will be described by using FIG. 14A, FIG. 14B, and FIG. 15. FIG. 14A and FIG. 14B are schematic diagrams illustrating examples of different images captured by a fixed camera in the face recognition system according to the present example embodiment. FIG. 15 is a block diagram illustrating a functional configuration of a face recognition system according to the present example embodiment. Note that components similar to those in the face recognition system and the face recognition method according to the first and second example embodiments described above will be labeled with the same reference numeral, and the description thereof will be omitted or simplified.

The basic configuration of the face recognition system according to the present example embodiment is substantially the same as the face recognition system according to the configuration of the first example embodiment. The face recognition system according to the present example embodiment is different from the face recognition system according to the first example embodiment in that the face matching apparatus 30 further has an identical-person processing unit that performs a process when visitors of an identical person are captured in different frames of images captured by the fixed camera 20.

When an area in front of the gate apparatus 10 is captured by the fixed camera 20, visitors of an identical person may be captured in different frames of images.

FIG. 14A and FIG. 14B illustrate different frames of images Im and In successively captured by the fixed camera 20, respectively. The image In is a later frame of image than the image Im. In the image Im, visitors Vs, Vt, and Vu are captured. On the other hand, also in the image In later than the image Im, the visitor Vs who was captured in the image Im is captured.

In the present example embodiment, when visitors of an identical person are captured in a different frame of images in such a way, the detected face images are classified on an identical person basis. The priority based on the quality or the like is then determined for the detected face image of the identical person, and matching of a face feature amount against a registered face image is performed in descending order of priority. This allows more efficient N:1 matching to be performed.

As illustrated in FIG. 15, in a face recognition system 3 according to the present example embodiment, the face matching control unit 302 of the face matching apparatus 30 further has an identical-person processing unit 320.

The identical-person processing unit 320 classifies detected face images detected by the face detection unit 310 into respective identical persons. Furthermore, the identical-person processing unit 320 calculates a priority for determining the order of performing matching of a face feature amount against the registered face image for a plurality of detected face images classified into identical persons. The identical-person processing unit 320 can calculate the priority based on a positional relationship of detected face images, a facial likeness score, a quality, or the like in a similar manner to the priority calculation unit 318 according to the second example embodiment.

Note that, also in the present example embodiment, the face matching apparatus 30 can have the same hardware configuration as the hardware configuration illustrated in FIG. 6. In this case, the CPU 3002 executes a program implementing the function of the identical-person processing unit 320.

The face matching unit 314 performs matching of face feature amounts against a registered face images in descending order of priority for a plurality of detected face images classified into an identical person in N:1 matching.

As discussed above, according to the present example embodiment, in N:1 matching, since matching of face feature amounts against a registered face image is performed in descending order of priority for detected face images classified into an identical person, the N:1 matching can be performed efficiently. Therefore, according to the present example embodiment, face matching can be performed more smoothly in a shorter time.

Note that, while the identical-person processing unit 320 is further provided in addition to the configuration of the face recognition system according to the first example embodiment above has been described above, the example embodiment is not limited thereto. The identical-person processing unit 320 may be further provided in addition to the configuration of the face recognition system according to the second example embodiment.

Fourth Example Embodiment

Figure 16:
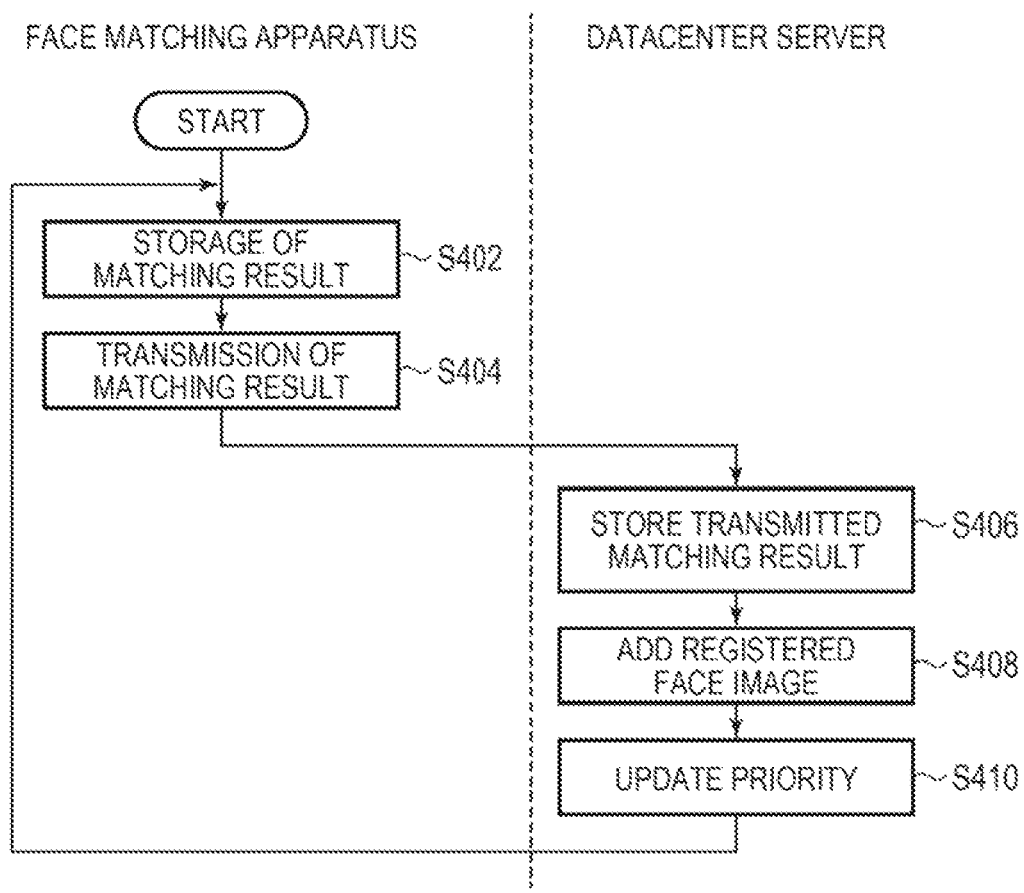
FIG. 16 is a flowchart illustrating automatic update of a registered face image in the face recognition system according to a fourth example embodiment of the present invention.

A face recognition system and a face recognition method according to a fourth example embodiment of the present invention will be described by using FIG. 16, FIG. 17A, FIG. 17B, and FIG. 17C. FIG. 16 is a flowchart illustrating automatic update of a registered face image in a face recognition system according to the present example embodiment. FIG. 17A, FIG. 17B, and FIG. 17C are schematic diagrams illustrating various data in automatic update of a registered face image in the face recognition system according to the present example embodiment. Note that components similar to those in the face recognition system and the face recognition method according to the first to third example embodiments described above will be labeled with the same reference numeral, and the description thereof will be omitted or simplified.

The basic configuration of the face recognition system according to the present example embodiment is substantially the same as the configuration of the face recognition system according to the first example embodiment. When the matching performed by the face matching unit 314 of the face matching apparatus 30 is matched, the face recognition system according to the present example embodiment updates a registered face image stored in the datacenter server 40 based on the matching result.

An update process of a registered face image in a face recognition system according to the present example embodiment will be described below by using FIG. 16, FIG. 17A, FIG. 17B, and FIG. 17C.

In the face matching apparatus 30, if matching is matched as a result of N:1 matching, the face matching unit 314 stores the matching result (step S402). The face matching unit 314 can store the matching result in the storage unit 304 or can store the matching result in a storage unit provided separately from the storage unit 304.

FIG. 17A illustrates an example of a matching result stored by the face matching unit 314. As illustrated in FIG. 17A, ID information of an annual pass on ticket presentation, image data of a detected face image matched to matching against a registered face image, a face feature amount of the detected face image, and a matching score are stored in association with each other. The matching result is stored for each ID information of an annual pass on ticket presentation. Note that the face matching unit 314 can further store a facial likeness score of a detected face image in which a matching is matched as well as other information in association together, for example.

Next, the face matching unit 314 transmits the stored matching result to the datacenter server 40 regularly or irregularly (step S404). For example, the face matching unit 314 can transmit a matching result to the datacenter server 40 on a daily basis.

In the datacenter server 40 to which a matching result is transmitted, the control unit 402 stores the transmitted matching result (step S406). The control unit 402 can store the matching result in the storage unit 404 or can store a storage unit provided separately from the storage unit 404.

Next, the control unit 402 regularly or irregularly processes the stored matching result. Specifically, the control unit 402 stores the detected face image associated with ID information in the storage unit 404 by newly adding it as a registered face image associated with the ID information (step S408). Further, the face feature amount of the newly added registered face image is stored in the storage unit 404 in association with the ID information. In such a way, for the same ID information, a plurality of registered face images and the face feature amounts thereof are stored and registered in association with each other. As discussed above, the control unit 402 functions as an update unit that additionally registers the detected face image in which matching is matched to the registered face image as a new registered face image and additionally updates the registered face image.

FIG. 17B illustrates a plurality of registered face images registered in association with the same ID information and the face feature amounts thereof. As illustrated in FIG. 17B, the control unit 402 additionally stores a detected face image in which matching is matched as a new registered face image together with the face feature amount in addition to existing registered face images.

Next, the control unit 402 updates the priority of a plurality of registered face images stored in association with the same ID information (step S410). The control unit 402 can calculate a priority based on a facial likeness score or the like in a similar manner to the priority calculation unit 318 according to the second example embodiment and update the priority of the plurality of registered face images.

FIG. 17C illustrates a case where a priority is calculated for a plurality of registered face images illustrated in FIG. 17B.

The plurality of registered face images whose priorities have been updated in such a way are subjected to the N:1 matching performed by the face matching unit 314 of the face matching apparatus 30 in descending order of priority.

The process illustrated in FIG. 16 described above is performed repeatedly during the face recognition system according to the present example embodiment being operated.

As described above, according to the present example embodiment, since the registered face images stored in the datacenter server 40 are updated based on a matching result from the face matching unit 314 of the face matching apparatus 30, the accuracy of face matching can be maintained to be high.

Note that, while the case where the registered face images are updated in the face recognition system according to the first example embodiment has been described above, the example embodiment is not limited thereto. The registered face images can be updated in the same manner as above in the face recognition system according to the second and third example embodiment.

Fifth Embodiment

Figure 18:
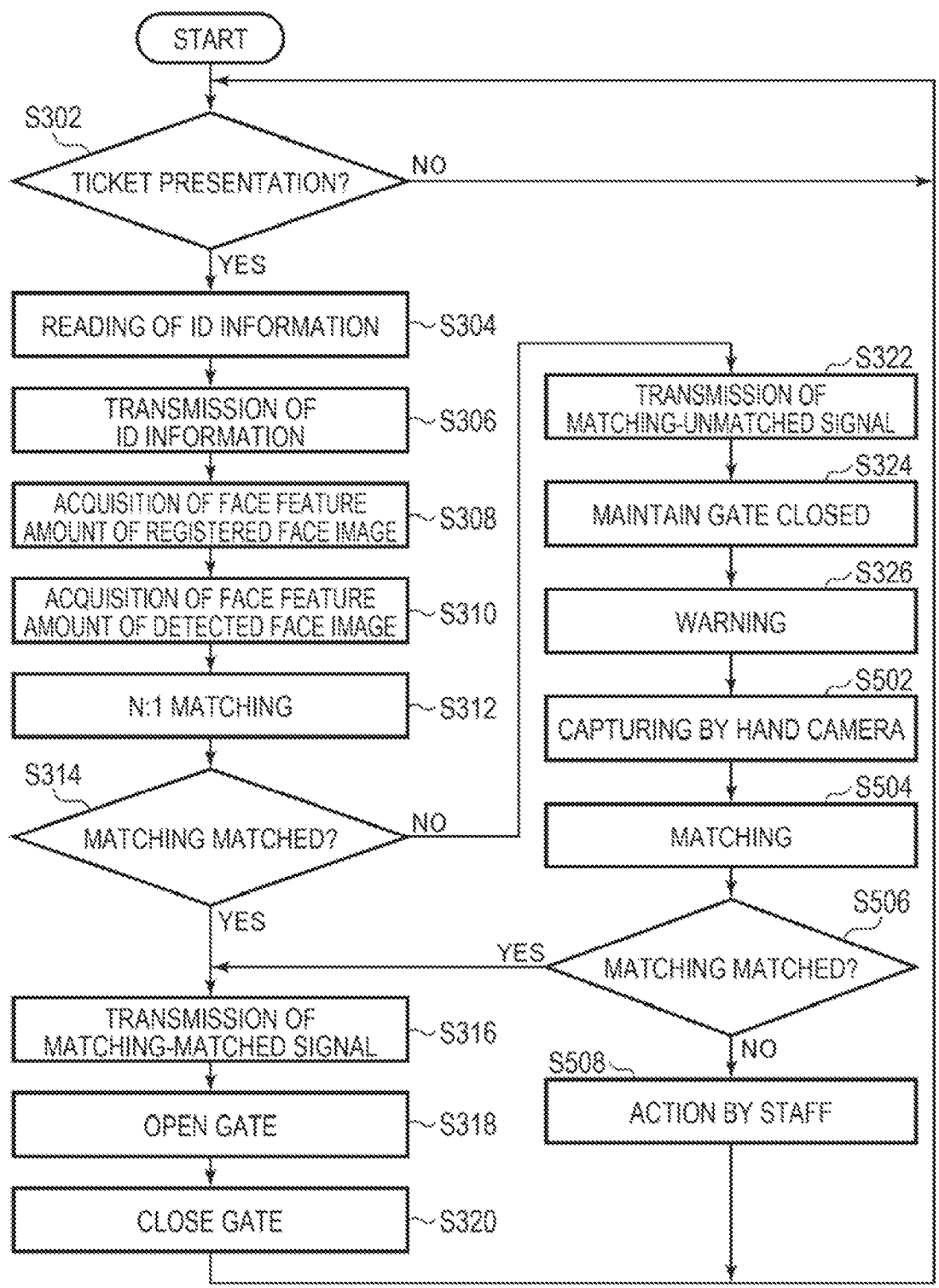
FIG. 18 is a flowchart illustrating a face recognition method according to a fifth example embodiment of the present invention.

A face recognition system and a face recognition method according to a fifth example embodiment of the present invention will be described by using FIG. 18. FIG. 18 is a flowchart illustrating the face recognition method according to the present example embodiment. Note that components similar to those in the face recognition system and the face recognition method according to the first to fourth example embodiments described above will be labeled with the same reference numeral, and the description thereof will be omitted or simplified.

In the present example embodiment, when identity verification by face matching based on an image captured by the fixed camera 20 is failed, a face image of a visitor is captured by the hand camera 110 to perform face matching in the first example embodiment. The face recognition method according to the present example embodiment will be described below by using FIG. 18.

Also in the present example embodiment, identity verification by face matching is performed based on an image captured by the fixed camera 20 in the same manner as in the first example embodiment. As illustrated in FIG. 18, since steps S302 to S314, steps S316 to S320 when matching is matched, and steps S322 to S326 when all the matching is unmatched are performed in the same manner as in the first example embodiment, the description thereof will be omitted.

When a warning is output in response to a failed identity verification by face matching based on an image captured by the fixed camera 20 (step S326), the staff of the facility uses the hand camera 110 of the gate apparatus 10 to capture the face of the visitor who is failed in identity verification thereof (step S502). Note that, in the following, a face image of a face of a visitor captured by the hand camera 110 may also be referred to as an in-hand face image.

Once an in-hand face image is captured by the hand camera 110, the gate control unit 112 transmits image data of the in-hand face image to the face matching apparatus 30.

In the face matching apparatus 30, the face feature amount extraction unit 312 extracts a face feature amount of the transmitted in-hand face image.

Next, the face matching unit 314 matches the face feature amount of the in-hand face image extracted by the face feature amount extraction unit 312 against a face feature amount of a registered face image registered in association with ID information of the annual pass on ticket presentation (step S504).

If the matching by the face matching unit 314 based on the in-hand face image is matched (step S506, YES), the process transfers to step S316 to open the gate 106 (step S318). The visitor who made ticket presentation is able to walk through the path 114 of the gate apparatus 10 to enter the inside of the facility as a person who is successful in identity verification by face matching based on the in-hand face image. Then, the gate 106 is closed (step S320).

In contrast, if the matching by the face matching unit 314 based on the in-hand face image is unmatched (step S506, NO), the visitor who made ticket presentation is attended by the staff of the facility as a person who is failed in identity verification by face matching based on the in-hand face image (step S508). For example, as an action by the staff of the facility, identity verification is again done by the staff of the facility.

As in the present example embodiment, when identity verification by face matching based on a detected face image by using the fixed camera 20 is failed, identity verification by face matching based on an in-hand face image by using the hand camera 110 can be performed.

Note that, while the case where face matching based on an in-hand face image by using the hand camera 110 is performed in the face recognition system according to the first example embodiment has been described above, the example embodiment is not limited thereto. The face matching based on an in-hand face image by using the hand camera 110 can be performed in the face recognition system in the same manner as above in the face recognition system according to the second to fourth example embodiment.

Sixth Embodiment

Figure 19:
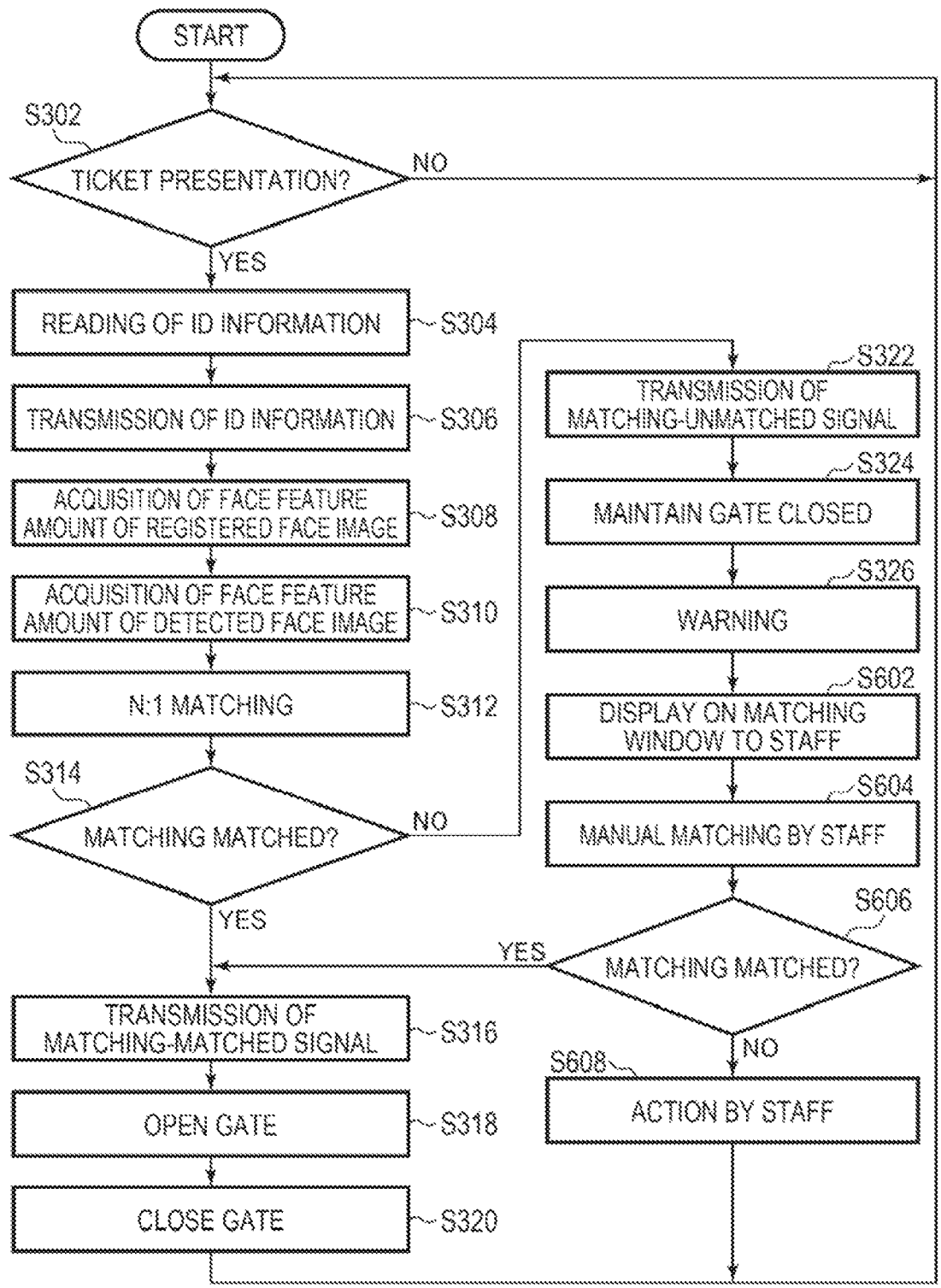
FIG. 19 is a flowchart illustrating a face recognition method according to a sixth example embodiment of the present invention.
Figure 20:
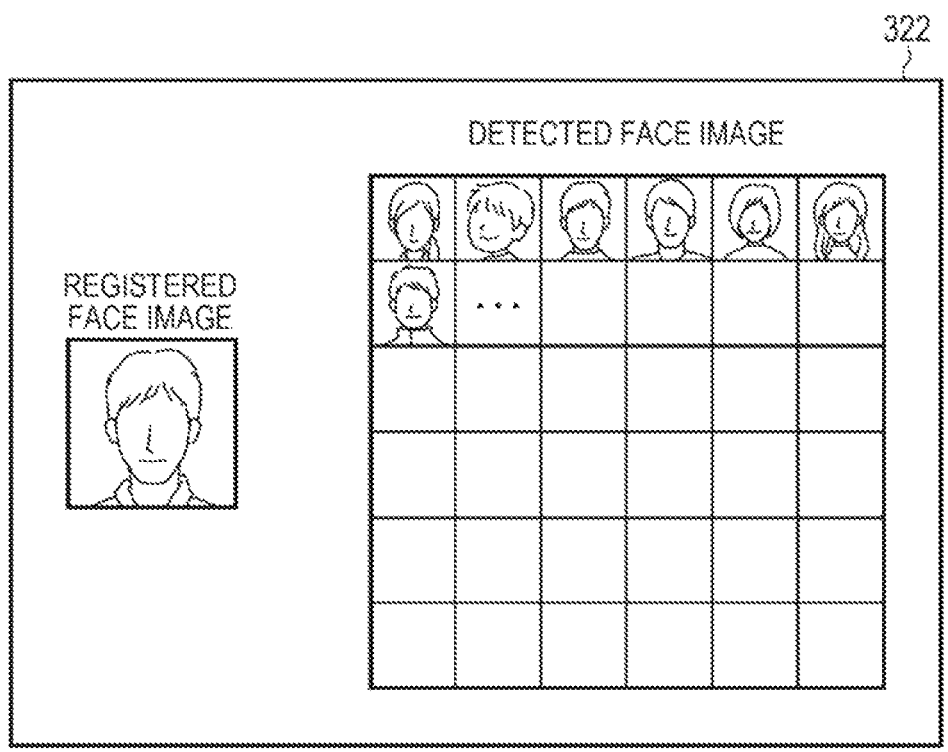
FIG. 20 is a schematic diagram illustrating an example of a matching window displayed on a display unit in the face recognition method according to the sixth example embodiment of the present invention.

A face recognition system and a face recognition method according to a sixth example embodiment of the present invention will be described by using FIG. 19 and FIG. 20. FIG. 19 is a flowchart illustrating the face recognition method according to the present example embodiment. FIG. 20 is a schematic diagram illustrating an example of a matching window displayed on a display unit in the face recognition method according to the present example embodiment. Note that components similar to those in the face recognition system and the face recognition method according to the first to fifth example embodiments described above will be labeled with the same reference numeral, and the description thereof will be omitted or simplified.

In the present example embodiment, when identity verification by face matching based on an image captured by the fixed camera 20 is failed in the face recognition system in the first example embodiment, a registered face image and a detected face image are manually matched through visual observation by the staff of the facility. The face recognition method according to the present example embodiment will be described below by using FIG. 19 and FIG. 20.

Also in the present example embodiment, identity verification by face matching is performed based on an image captured by the fixed camera 20 in the same manner as in the first example embodiment. As illustrated in FIG. 19, since steps S302 to S314, steps S316 to S320 when matching is matched, and steps S322 to S326 when all the matching is unmatched are performed in the same manner as in the first example embodiment, the description thereof will be omitted.

When a warning is output in response to a failed identity verification by face matching based on an image captured by the fixed camera 20 (step S326), the face matching unit 314 displays a matching window on the display unit 306 to the staff of the facility in the face matching apparatus 30 (step S602). Specifically, the face matching unit 314 displays a matching window on the display unit 306 in which a registered face image and N detected face images on which the N:1 matching has been performed are displayed.

FIG. 20 illustrates an example of a matching window displayed on the display unit 306. As illustrated in FIG. 20, N detected face images in which matching by the face matching unit 314 is unmatched are displayed together with a registered face image in a matching window 322. Each of the N detected face images is determined that, as a result of matching by the face matching unit 314, the matching is unmatched. As discussed above, a registered face image and N detected face images in which matching by the face matching unit 314 is unmatched are displayed in the matching window 322 displayed on the display unit 306 so that the staff of the facility can perform visual matching.

The staff of the facility views the matching window displayed on the display unit 306 to perform matching manually (step S604). Specifically, out of N detected face images displayed in the matching window, the staff of the facility selects a detected face image which can be determined as the same person as a person of the registered face image displayed together. The display unit 306 is formed of a touch panel and functions as an input unit, for example. In this case, the staff of the facility may touch the detected face image displayed in the matching window and input the selected result to the face matching apparatus 30. Note that a selected result may be input to the face matching apparatus 30 by using other input units such as a mouse, a keyboard, or the like.

If the matching is matched as a result of manual matching (step S606, YES), that is, a detected face image which is determined as the same person as a person of the registered face image is selected, the process transfers to step S316 to open the gate 106 (step S318). The visitor who the made ticket presentation is able to walk through the path 114 of the gate apparatus 10 to enter the inside of the facility as a person who is successful in identity verification by face matching based on the manual matching by the staff of the facility. Then, the gate 106 is closed (step S320).

On the other hand, if the matching is unmatched as a result of manual matching (step S606, NO), that is, there is no detected face image which is determined as the same person as a person of the registered face image, an action in which identity verification is again performed by the staff of the facility or the like is taken (step S608).

The detected face image selected by the staff of the facility in the manual matching as described above can be registered as a new registered face image. In this case, the face matching unit 314 of the face matching apparatus 30 transmits image data of the selected detected face image and the face feature amount thereof to the datacenter server 40.

In the datacenter server 40, the control unit 402 stores the transmitted detected face image as a new registered face image in the storage unit 404 in association with the ID information of the annual pass on the ticket presentation. At this time, the control unit 402 also stores the face feature amount of the new registered face image in the storage unit 404 in association with the ID information of the annual pass on the ticket presentation.

As in the present example embodiment, when identity verification by face matching based on a detected face image by the fixed camera 20 is failed, identity verification can be performed based on manual matching through visual observation by the staff of the facility.

Note that, while the case where manual matching through visual observation by the staff of the facility is performed in the face recognition system according to the first example embodiment has been described above, the example embodiment is not limited thereto. The manual matching through visual observation by the staff of the facility can be performed in the face recognition system in the same manner as above in the face recognition system according to the second to fifth example embodiment.

Seventh Embodiment

Figure 21:
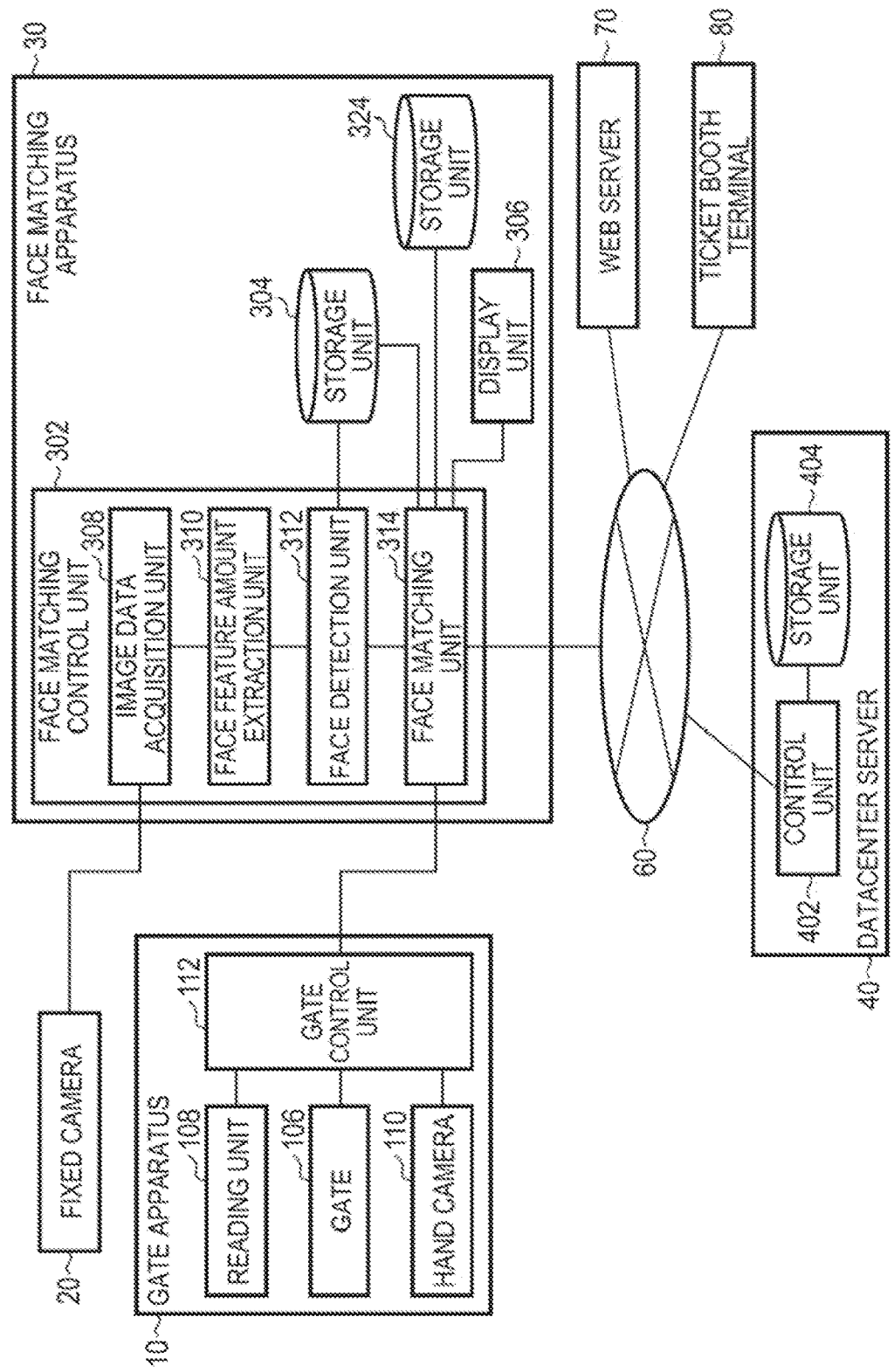
FIG. 21 is a block diagram illustrating a functional configuration of a face recognition system according to a seventh example embodiment of the present invention.

A face recognition system and a face recognition method according to a seventh example embodiment of the present invention will be described by using FIG. 21. FIG. 21 is a block diagram illustrating a functional configuration of the face recognition system of the present example embodiment. Note that components similar to those in the face recognition system and the face recognition method according to the first to sixth example embodiments described above will be labeled with the same reference numeral, and the description thereof will be omitted or simplified.

The basic configuration of the face recognition system according to the present example embodiment is substantially the same as the configuration of the face recognition system according to the first example embodiment. In the face recognition system according to the present example embodiment, a part of the information accumulated in the storage unit 404 of the datacenter server 40 is stored in the face matching apparatus 30. In this regard, the face recognition system according to the present example embodiment is different from the face recognition system according to the first example embodiment.

As illustrated in FIG. 21, a face recognition system 4 according to the present example embodiment further has a storage unit 324. Note that the storage unit 324 may be formed of the same storage device as the storage unit 304.

The storage unit 324 stores registered face images registered in association with ID information of issued annual passes and the face feature amounts thereof. The registered face images and the face feature amounts thereof stored in the storage unit 324 are a part of the registered face images and the face feature amounts thereof accumulated in the storage unit 404 of the datacenter server 40.

In the storage unit 324, a relational database is configured. In the relational database of the storage unit 324, face feature amounts of registered face images are stored in association with ID information of annual passes and face image data of the registered face images, as described above. Such mutually associated data is managed by an RDBMS. As an RDBMS, without being limited in particular, Microsoft (registered trademark) SQL Server is used, for example.

Also in the present example embodiment, in the same manner as in the first example embodiment, first, the face matching unit 314 attempts to acquire, online, a face feature amount of a registered face image registered in association with ID information of an annual pass on ticket presentation from the datacenter server 40 via the network 60.

At this time, there may be a case where the face matching apparatus 30 cannot be connected to the datacenter server 40 via the network 60 for some reason such as the face matching apparatus 30 being offline. When the face matching apparatus 30 cannot be connected to the datacenter server 40, the face matching unit 314 cannot acquire, online, a face feature amount of a registered face image from the datacenter server 40 via the network 60.

In this case, the face matching unit 314 refers to the relational database in the storage unit 324 of the face matching apparatus 30 and acquires, offline, the face feature amount of the registered face image registered in association with the ID information of the annual pass on the ticket presentation.

The face matching unit 314 can use a registered face image acquired from the storage unit 324 of the face matching apparatus 30 to perform N:1 matching in the same manner as the first example embodiment As discussed above, according to the present example embodiment, the face matching apparatus 30 has the storage unit 324 offline in which registered face images registered in association with ID information of the annual passes and the face feature amounts thereof are stored. Therefore, according to the present example embodiment, even when face feature amounts of registered face images cannot be acquired from the datacenter server 40 online, face matching can be performed.

Eighth Example Embodiment

A face recognition system and a face recognition method according to an eighth example embodiment of the present invention will be described by using FIG. 22 to FIG. 24. Note that components similar to those in the face recognition system and the face recognition method according to the first to seventh example embodiments described above will be labeled with the same reference numeral, and the description thereof will be omitted or simplified.

First, the face recognition system according to the present example embodiment will be described by using FIG. 22 and FIG. 23. FIG. 22 is a schematic diagram illustrating the face recognition system according to the present example embodiment. FIG. 23 is a block diagram illustrating a functional configuration of the face recognition system according to the present example embodiment.

In the above first to eighth embodiments, the case of performing identity verification by face matching on a visitor as an authentication subject who is going to enter the inside of the facility by using an admission ticket at an entrance gate of a facility has been described. However, a situation of performing identity verification by face matching is not limited thereto. In the present example embodiment, a case of performing identity verification by face matching on a shopping customer as an authentication subject who performs electronic payment by using a credit card, a debit card, electronic money, or the like at a cashier area such as a register counter where a register terminal is installed in a shop will be described.

Figure 22:
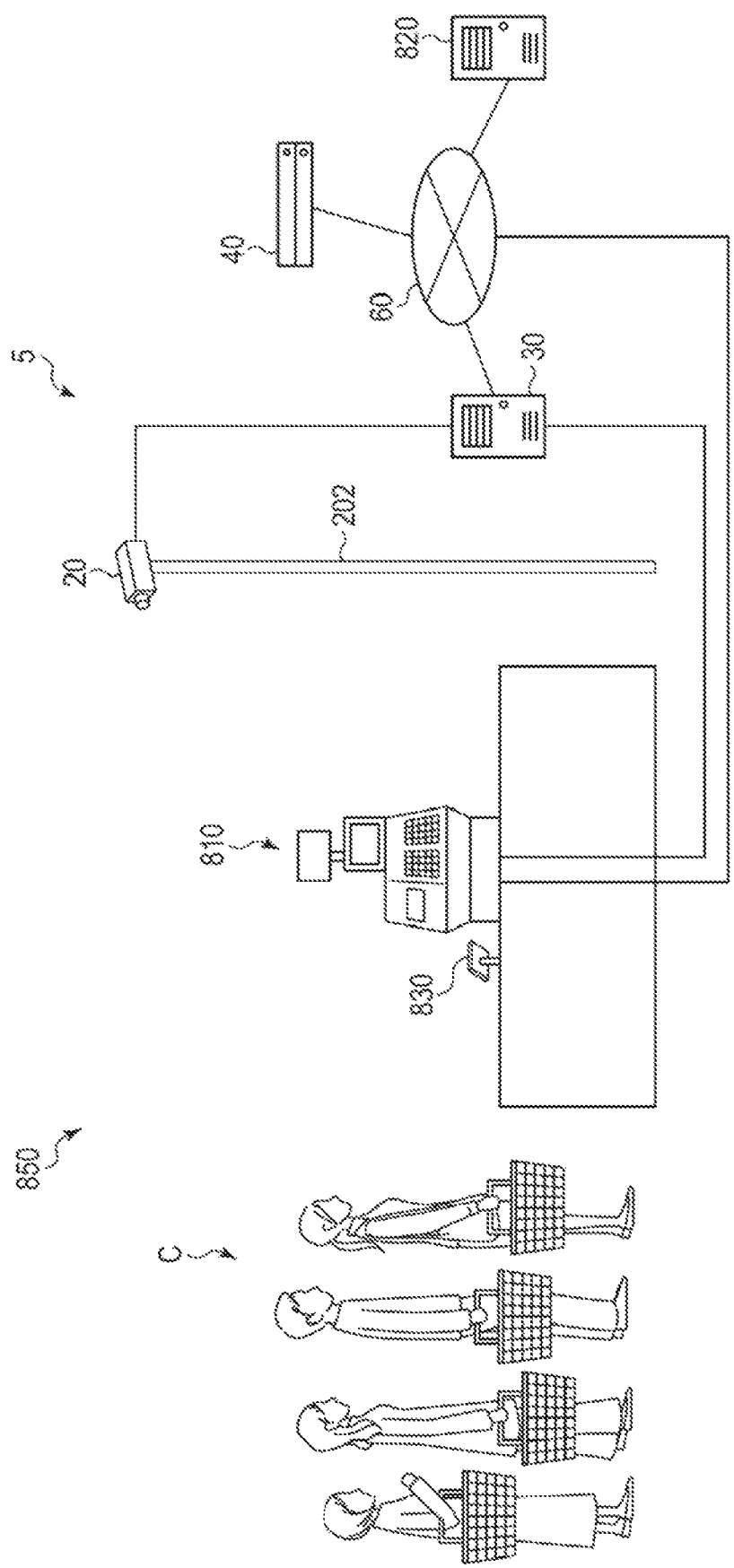
FIG. 22 is a schematic diagram illustrating a face recognition system according to an eighth example embodiment of the present invention.
Figure 23:
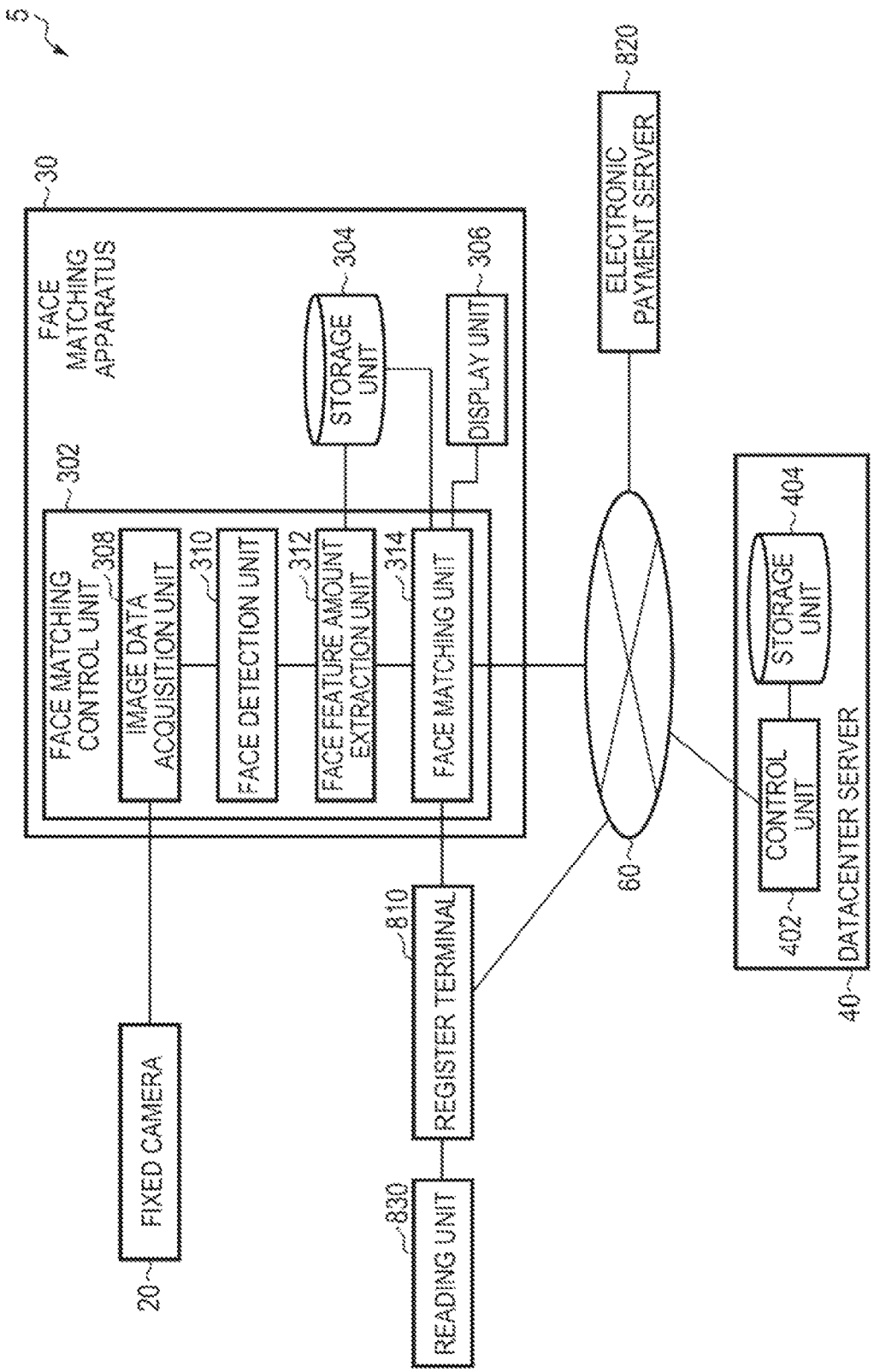
FIG. 23 is a block diagram illustrating a functional configuration of the face recognition system according to the eighth example embodiment of the present invention.

As illustrated in FIG. 22 and FIG. 23, a face recognition system 5 according to the present example embodiment includes a register terminal 810, the fixed camera 20, the face matching apparatus 30, the datacenter server 40, and an electronic payment server 820. The register terminal 810, the fixed camera 20, and the face matching apparatus 30 are installed at a casher area 850 of a shop. On the other hand, the datacenter server 40 is installed inside a datacenter remote from the casher area 850, for example. Further, the electronic payment server 820 is a server of a company that provides an electronic payment system, for example.

The face matching apparatus 30 and the datacenter server 40 are connected to a network via the network 60, respectively, and can communicate with each other via the network 60 in the same manner as in the first example embodiment.

Further, the register terminal 810 and the electronic payment server 820 are connected to a network via the network 60, respectively, and can communicate with each other via the network 60.

Further, the register terminal 810 and the fixed camera 20 are directly, locally connected to the face matching apparatus 30 in a communicable manner through cable connection or the like, respectively. The connection among the register terminal 810, the fixed camera 20, and the face matching apparatus 30 may be of a wired scheme or a wireless scheme.

Next, each unit of the face recognition system 5 in the present example embodiment will be described in detail.

The register terminal 810 reads price information of a purchase item purchased by a shopping customer as well as other information and performs an accounting process for the purchase item. As described later, the register terminal 810 performs an accounting process based on electronic payment information notified when identity verification is successful by face matching.

A reading unit 830 is connected to the register terminal 810. The reading unit 830 is installed near the register terminal 810 adjacent to the register terminal 810. The reading unit 830 reads information recorded in a membership card of a shop carried by a shopping customer. Specifically, in a membership card, ID information that uniquely identifies the membership card is recorded. The reading unit 830 reads ID information from a membership card. The ID information read by the reading unit 830 is a membership number of the membership card, for example. A shopping customer using a shop carries a membership card when using the shop and causes the reading unit 830 to read the membership card in accounting. The membership card is a medium that is carried by a shopping customer, which is an authentication subject, and required when the shopping customer makes a payment and in which ID information uniquely identifying this is recorded. As described later, in the datacenter server 40, information on registered members to which membership cards are issued in association with ID information on the membership cards is accumulated.

The reading unit 830 has a reading scheme in accordance with a recording scheme of ID information of a membership card. For example, when a membership card has ID information recorded in a one-dimensional code such as a barcode or a two-dimensional code such as a QR code (registered trademark), the reading unit 108 is a code reader such as a barcode reader, a QR code reader, or the like. Further, for example, when a membership card has ID information recorded in a non-contact IC card or a non-contact IC tug with Radio Frequency Identification (RFID), the reading unit 830 is an RFID reader.

When there is ticket presentation of a membership card on the reading unit 830, the reading unit 830 reads ID information recorded in the membership card from the membership card. Note that ticket presentation here means that a shopping customer who is an authentication subject causes the reading unit 830 to read information including the ID information recorded in a membership card.

The reading unit 830 transmits ID information read from a membership card to the register terminal 810. The register terminal 810 transmits, to the face matching apparatus 30, the ID information of the membership card transmitted from the reading unit 830.

Further, the register terminal 810 performs an accounting process based on the electronic payment information transmitted from the face matching apparatus 30 described later.

The fixed camera 20 is fixed to the upper end of a support pillar 202 installed on the exit side of the cashier area 850 with respect to the register terminal 810. The fixed camera 20 captures an image of an area in front of the register terminal 810, and the orientation facing the entrance side of the cashier area 850 is fixed. The fixed camera 20 is fixed at a height located above a head of a human of a height of around 200 cm, for example, from the ground face at the cashier area 850 and is directed obliquely downward to face an area in front of the register terminal 810. Note that a fixing scheme of the fixed camera 20 is not limited to a scheme using the support pillar 202. For example, the fixed camera 20 may be hanged from and fixed to the ceiling.

The fixed camera 20 fixed as described above captures an image of an area in front of the register terminal 810 that is the entrance side to the installation area of the register terminal 810 and the reading unit 830. Thereby, the fixed camera 20 can capture a shopping customer C in the area in front of the register terminal 10 that is the entrance side to the installation area of the reading unit 830.

Since other features of the fixed camera 20 is the same as those in the above first example embodiment, the description thereof will be omitted.

The face matching apparatus 30 has the face matching control unit 302, the storage unit 304, and the display unit 306 in the same manner as the first example embodiment. The face matching control unit 302 includes the image data acquisition unit 308, the face detection unit 310, the face feature amount extraction unit 312, and the face matching unit 314.

The image data acquisition unit 308 sequentially acquires image data of images transmitted from the fixed camera 20 at a predetermined cycle in the same manner as the first example embodiment.

The face detection unit 310 performs face detection on respective images of image data sequentially acquired from the image data acquisition unit 308 in the same manner as the first example embodiment. Note that, in the present example embodiment, the face detection unit 310 detects a face image of a shopping customer in an area in front of the register terminal 810.

The face feature amount extraction unit 312 extracts a face feature amount for respective detected face images detected by the face detection unit 310 in the same manner as the first example embodiment. Further, the face feature amount extraction unit 312 temporarily stores face image data, a face feature amount, a detection number, and a capturing time in the storage unit 304 in association with each other for respective detected face images in the same manner as the first example embodiment.

A relational database is configured in the storage unit 304, and face feature amounts and data related thereto are temporarily stored for a certain time period from the capturing time for respective detected face images in the same manner as the first example embodiment.

In response to ticket presentation of a membership card at the reading unit 830 connected to the register terminal 810, the face matching unit 314 performs identity verification by face matching for a shopping customer who made ticket presentation of the membership card at the reading unit 830.

ID information read by the reading unit 830 from the membership card on ticket presentation is transmitted to the face matching unit 314. The face matching unit 314 acquires the transmitted ID information and, via the network 60 from the datacenter server 40 described later, acquires a face feature amount of a registered face image registered in association with the ID information. A person of a registered face image acquired by the face matching unit 314 in such a way is a valid user who is allowed to validly use the membership card on ticket presentation. A valid user of a membership card is a registered member to which the membership card was issued, for example.

Further, in the same manner as the first example embodiment, the face matching unit 314 refers to the relational database of the storage unit 304 and acquires face feature amounts of N detected face images associated with the capturing time included in a predetermined period before ticket presentation. That is, the face matching unit 314 acquires face feature amounts of N detected face images captured by the fixed camera 20 before the reading unit 830 reads ID information from a membership card.

The face matching unit 314 performs N:1 matching that sequentially matches respective face feature amounts of N detected face images, which have been captured before ticket presentation of a membership card, against a face feature amount of a registered face image in the same manner as the first example embodiment.

If matching by the face matching unit 314 is matched, this means that a valid user of a membership card on ticket presentation is in shopping customers in front of the register terminal 810 before the ticket presentation. Thus, it can be estimated that a valid user of a membership card made the ticket presentation of the membership card. Therefore, in this case, identity verification by face matching is successful.

On the other hand, if all the matching by the face matching unit 314 is unmatched, this means that there is no valid user of a membership card on ticket presentation in shopping customers in front of the register terminal 810 before the ticket presentation. Therefore, in this case, identity verification by face matching is failed.

A matching result or the like by the face matching unit 314 can be displayed on the display unit 306. The staff of the shop can confirm a matching result or the like by viewing the display on the display unit 306.

The face matching unit 314 transmits, to the register terminal 810, a matching result signal that is a signal indicating the matching result described above. Specifically, the face matching unit 314 transmits, to the register terminal 810, a matching-matched signal that is a signal indicating that the matching performed by the face matching unit 314 is matched or a matching-unmatched signal that is a signal indicating that all the matching performed by the face matching unit 314 is unmatched.

Furthermore, if the matching is matched, the face matching unit 314 acquires payment option information via the network 60 from the datacenter server 40 described later. The payment information is information used for performing an electronic payment stored in association with ID information of a membership card in which matching is matched and may be a credit card number or electronic money ID information, for example. The face matching unit 314 transmits the acquired payment option information to the register terminal 810 together with the matching-matched signal.

When a matching-matched signal is transmitted from the face matching unit 314, the register terminal 810 requests an electronic payment to the electronic payment server 820 described later. In this case, the register terminal 810 transmits, to the electronic payment server 820, electronic payment information that is information including the payment option information transmitted together with the matching-matched signal and an accounting price of a purchased item.

On the other hand, when a matching-unmatched signal is transmitted from the face matching unit 314, the register terminal 810 uses a warning display, a warning sound, or the like to notify the shop staff operating the register terminal 810 that the electronic payment cannot be made.

The datacenter server 40 has the control unit 402 and the storage unit 404 in the same manner as the first example embodiment.

The storage unit 404 accumulates registered face images registered in association with ID information of issued membership cards and face feature amounts thereof. Furthermore, in the storage unit 404, payment option information associated with ID information of membership cards is stored.

In response to a request from the face matching unit 314, the control unit 402 provides, to the face matching unit 314, a face feature amount of a registered face image registered in association with the ID information of the membership card on ticket presentation. Furthermore, in response to a request from the face matching unit 314, the control unit 402 provides, to the face matching unit 314, the payment option information associated with the ID information of the membership card on thicket presentation.

A registered face image can be uploaded to the datacenter server 40 from a terminal in a shop, a terminal of a shopping customer, or the like when the shopping customer acquires a membership card of the shop, for example. In the datacenter server 40, the control unit 402 accumulates the uploaded registered face image in the storage unit 404.

For a registered face image accumulated in the storage unit 404 of the datacenter server 40 as described above, a face feature amount is extracted and accumulated in the storage unit 404 in the same manner as the first example embodiment.

A relational database is configured in the storage unit 404, and face feature amounts of registered face images are stored in association with ID information of membership cards and face image data of the registered face images in the same manner as the first example embodiment. Furthermore, in the storage unit 404, payment option information is stored in association with ID information of membership cards.

Note that, in the relational database of the storage unit 404, for example, information on names, contact addresses, or the like of registered members who are valid users of membership cards is stored in addition to the above in association with ID information of membership cards.

The electronic payment server 820 performs an electronic payment by a credit card, an electronic money, or the like. The electronic payment server 820 performs an electronic payment for an item purchased by a shopping customer based on the electronic payment information transmitted from the register terminal 810.

As described above, the face recognition system 5 according to the present example embodiment matches, against a registered face image registered in association with the ID information of the membership card on the ticket presentation, detected face images captured by the fixed camera 20 before ticket presentation in which the reading unit 830 reads ID information from a membership card is performed. That is, in the face recognition system 5 according to the present example embodiment, the detected face image that is an image of a matching subject to be matched against a registered face image is acquired in advance before ticket presentation of a membership card.

Thus, according to the present example embodiment, after a shopping customer makes ticket presentation of a membership card, it is not necessary to capture a face image of the shopping customer as an image of a matching subject to be matched against a registered face image by the staff of a shop. Further, the shopping customer neither needs to concern about capturing of the face image thereof nor needs to perform a special move such as positioning of the face thereof for the capturing. Therefore, according to the present example embodiment, face matching can be made smoothly in a short time.

Figure 24:
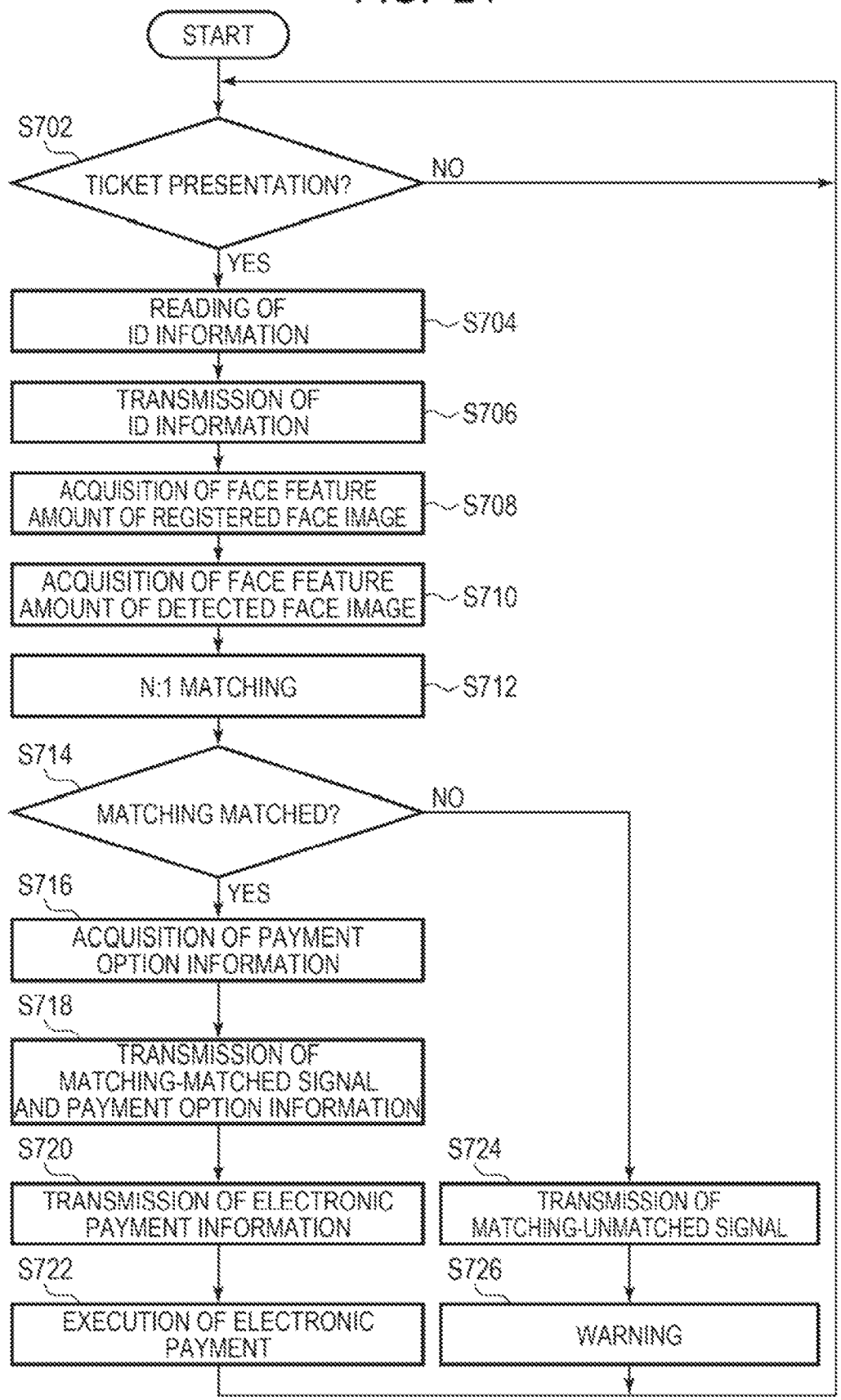
FIG. 24 is a flowchart illustrating a face recognition method according to the eighth example embodiment of the present invention.

Next, a face recognition method according to the present example embodiment using the face recognition system 5 according to the present example embodiment will be further described by using FIG. 24. FIG. 24 is a flowchart illustrating the face recognition method according to the present example embodiment.

The fixed camera 20 captures an area in front of the register terminal 810 that is the entrance side to the installation area of the reading unit 830 and acquires a plurality of images continuously at a predetermined cycle. Since the process before temporality storing a face feature amount of a detected face image from the capturing by the fixed camera 20 is the same as the process illustrated in FIG. 9 of the first example embodiment except that the capturing area by the fixed camera 20 is different, the description thereof will be omitted.

A process from the ticket presentation of a membership card to execution of an electronic payment will be described below by using FIG. 24.

At the register terminal 810, the reading unit 830 stands by until ticket presentation of a membership card is performed (step S702, NO).

In response to ticket presentation of the membership card at the reading unit 830 by a shopping customer (step S702, YES), the reading unit 830 reads ID information recorded in the membership card from the membership card (step S704).

Subsequently, the register terminal 810 transmits the ID information read by the reading unit 830 to the face matching apparatus 30 (step S706).

In the face matching apparatus 30, the face matching unit 314 transmits, to the datacenter server 40 via the network 60, the ID information transmitted from the register terminal 810 and requests a face feature amount of a registered face image. Thereby, from the datacenter server 40 via the network 60, the face matching unit 314 acquires, online, a face feature amount of a registered face image registered in association with the transmitted ID information (step S708).

Further, the face matching unit 314 refers to the relational database of the storage unit 304 to acquire, offline, a face feature amount of N detected face images associated with the capturing time included in a predetermined period before the ticket presentation of the membership card (step S710). That is, the face matching unit 314 acquires face feature amounts of N detected face images captured by the fixed camera 20 before the reading unit 830 reads ID information from the membership card.

The face matching unit 314 performs N:1 matching that sequentially matches respective face feature amounts of the acquired N detected face images against the face feature amount of the acquired registered face image in the same manner as the first example embodiment (step S712).

If the matching performed by the face matching unit 314 is matched (step S714, YES), the face matching unit 314 acquires payment option information from the datacenter server 40 via the network 60 (step S716). Subsequently, the face matching unit 314 transmits, to the register terminal 810 together with the acquired payment option information, a matching-matched signal indicating that the matching performed by the face matching unit 314 is matched (step S718).

In response to the transmission of the matching-matched signal from the face matching unit 314, the register terminal 810 transmits, to the electronic payment server 820, electronic payment information including the transmitted payment option information and an accounting price of a purchased item (step S720).

The electronic payment server 820 executes the electronic payment for the item purchased by the shopping customer based on the electronic payment information transmitted from the register terminal 810 (step S722).

On the other hand, if all the matching performed by the face matching unit 314 is unmatched (step S714, NO), the face matching unit 314 transmits, to the register terminal 810, a matching-unmatched signal indicating that all the matching performed by the face matching unit 314 is unmatched (step S724).

In response to the transmission of the matching-unmatched signal from the face matching unit 314, the register terminal 810 uses a warning display, a warning sound, or the like to notify the shop staff operating the register terminal 810 that the electronic payment cannot be made (step S726).

The process illustrated in FIG. 24 described above is repeatedly performed every time ticket presentation is made at the reading unit 830 connected to the register terminal 810 during the face recognition method according to the present example embodiment being performed.

As discussed above, according to the present example embodiment, a face feature amount of a detected face image detected from an image captured by the fixed camera 20 before ticket presentation of a membership card is matched against a face feature amount of a registered face image registered in association with the ID information of the membership card on the ticket presentation. Therefore, according to the present example embodiment, face matching can be performed smoothly in a short time.

Note that, also when identity verification is performed by face matching at a cashier area where a register terminal is installed in the shop described above, the face recognition system may be configured in the same manner as the second to seventh example embodiments described above to perform the same process as that in the second to seventh example embodiments.

Ninth Example Embodiment

A computer apparatus according to the ninth example embodiment of the present invention will be described by using FIG. 25. In the present example embodiment, a computer apparatus used for implementing processes of respective units of the face recognition system according to the first to eighth example embodiments described above will be described.

Figure 25:
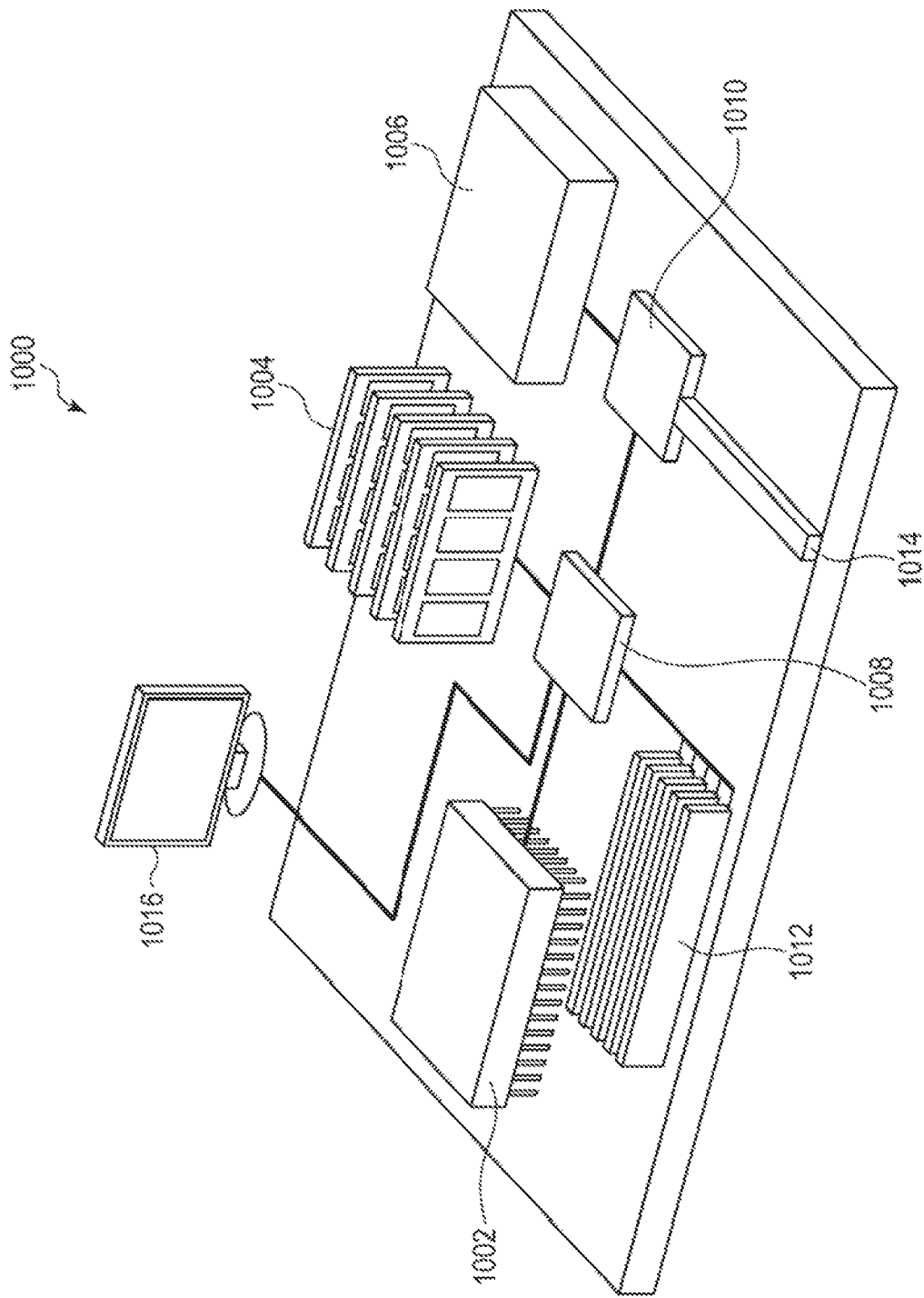
FIG. 25 is a schematic diagram illustrating an example of a computer apparatus.

FIG. 25 illustrates an example of a computer apparatus used for implementing processes of respective units of the face recognition system according to the first to eighth example embodiments described above will be described. A computer apparatus 1000 illustrated in FIG. 25 is not limited in particular but may be of various types or forms. For example, the computer apparatus 1000 may be a laptop computer, a desktop computer, a workstation, a personal digital assistant, a server, a blade server, a main frame, an embedded system, or the like.

The computer apparatus 1000 has a processor 1002, memory 1004, and a storage device 1006. Further, the computer apparatus 1000 has a high-speed controller 1008 including a high-speed interface and a low-speed controller 1010 including a low-speed interface. The memory 1004 and a high-speed expansion port 1012 are connected to the high-speed controller 1008. Further, an external input/output device such as a display 1016 or the like is connected to the high-speed controller 1008. On the other hand, a low-speed expansion port 1014 and the storage device 1006 are connected to the low-speed controller 1010.

The processor 1002, the memory 1004, the storage device 1006, the high-speed controller 1008, the low-speed controller 1010, and the high-speed expansion port 1012 are connected to each other through various buses. Further, the processor 1002, the memory 1004, the storage device 1006, the high-speed controller 1008, the low-speed controller 1010, and the high-speed expansion port 1012 may be implemented on a common motherboard or may be implemented in other forms as appropriate.

The processor 1002 is a central processing unit (CPU), for example, and is able to process instructions executed within the computer apparatus 1000. Such instructions include an instruction that is used for displaying graphics information of a graphical user interface (GUI) on an external input/output device such as the display 1016 and stored in the memory 1004 or the storage device 1006.

Further, a plurality of processors, a plurality of busses, or a plurality of processors and a plurality of busses can be used as appropriate together with a plurality of memory devices and multiple types of memory devices. Further, a plurality of computer apparatus 1000 can be connected to each device that performs a part of the necessary process. For example, a plurality of computer apparatus 1000 can be connected to each other as a server bank, a group of blade servers, or a multiprocessor system.

The memory 1004 stores therein information within the computer apparatus 1000. For example, the memory 1004 may be a volatile memory unit or a non-volatile memory unit. The memory 1004 may be another computer readable medium, such as a magnetic disk, an optical disk, or the like, for example.

The storage device 1006 can configure mass storage used for the computer apparatus 1000. The storage device 1006 may be, for example, a computer readable medium such as a floppy (registered trademark) disk device, a hard disk device, an optical disk device, a tape device, a solid state memory device such as a flash memory, a disk array, or the like. Further, the storage device 1006 may include such a computer readable storage medium. The storage device 1006 may include a storage area network or a device with another configuration. A computer program product may be tangibly embodied in an information carrier. The computer program product can also store an instruction that executes one or a plurality of processes as described above when executed. The information carrier may be a memory device such as the memory 1004, the storage unit 1006, or the memory on the processor 1002 or may be a computer readable medium or a machine readable medium such as a carrier signal.

The high-speed controller 1008 manages processes in which the bandwidth for the computer apparatus 1000 is intensively used. On the other hand, the low-speed controller 1010 manages processes in which the bandwidth is less intensively used. However, such allocation of the functions is a mere example, and allocation is not limited thereto. Further, a part or a whole of the high-speed controller 1008 may be incorporated in the processor 1002.

The high-speed controller 1008 is connected to the high-speed expansion port 1012 that can accept the memory 1004 and various expansion cards. Further, the high-speed controller 1008 is connected to the display 1016 via a graphics processor or an accelerator, for example.

Further, the low-speed controller 1010 is connected to the storage device 1006 and the low-speed expansion port 1014. The low-speed expansion port 1014 can include, for example, a communication port of various standards such as Universal Serial Bus (USB), Bluetooth (registered trademark), wired or wireless Ethernet (registered trademark), or the like. One or plurality of input/output devices such as a keyboard, a pointing device, a scanner, or the like can be connected to the low-speed expansion port 1014. Further, one or plurality of network devices such as a switch, a router, or the like can be connected to the low-speed expansion port 1014 via a network adapter, for example.

The computer apparatus 1000 can be implemented in many different forms. For example, the computer apparatus 1000 can be implemented in a form of a typical server or a plurality of servers in a form of a group of such servers. Further, the computer apparatus 1000 can be implemented as a part of the rack server system. Furthermore, the computer apparatus 1000 can be implemented in a form of a personal computer such as a laptop computer, a desktop computer, or the like.

The computer apparatus 1000 described above can function as a part of the gate apparatus 10 in the example embodiments described above. In this case, the processor 1002 of the computer apparatus 1000 can function as the gate control unit 112 by executing a program that implements the function of the gate control unit 112 of the gate apparatus 10.

Further, the computer apparatus 1000 can function as the face matching apparatus 30 in the example embodiments described above. In this case, the processor 1002 of the computer apparatus 1000 can function as the face matching control unit 302 by executing a program that implements the function of the face matching control unit 302 of the face matching apparatus 30. That is, the processor 1002 executes programs that implement the functions of respective units of the image data acquisition unit 308, the face detection unit 310, the face feature amount extraction unit 312, the face matching unit 314, the priority calculation unit 318, and the identical-person processing unit 320. Thereby, the processor 1002 can function as each unit of the image data acquisition unit 308, the face detection unit 310, the face feature amount extraction unit 312, the face matching unit 314, the priority calculation unit 318, and the identical-person processing unit 320. Further, the storage device 1006 of the computer apparatus 1000 can function as the storage units 304 and 324 of the face matching apparatus 30.

The computer apparatus 1000 can function as the datacenter server 40 in the example embodiments described above. In this case, the processor 1002 of the computer apparatus 1000 can function as the control unit 402 by executing a program that implements the function of the control unit 402 of the datacenter server 40. Further, the storage device 1006 of the computer apparatus 1000 can function as the storage unit 404 of the datacenter server 40.

Note that a part or a whole of the program executed by the processor 1002 of the computer apparatus 1000 can be provided by a computer readable storage medium storing the above, such as a digital versatile disc-read only memory (DVD-ROM), a compact disc-read only memory (CD-ROM), a flash memory such as a USB memory or the like.

Other Example Embodiments

Figure 26:
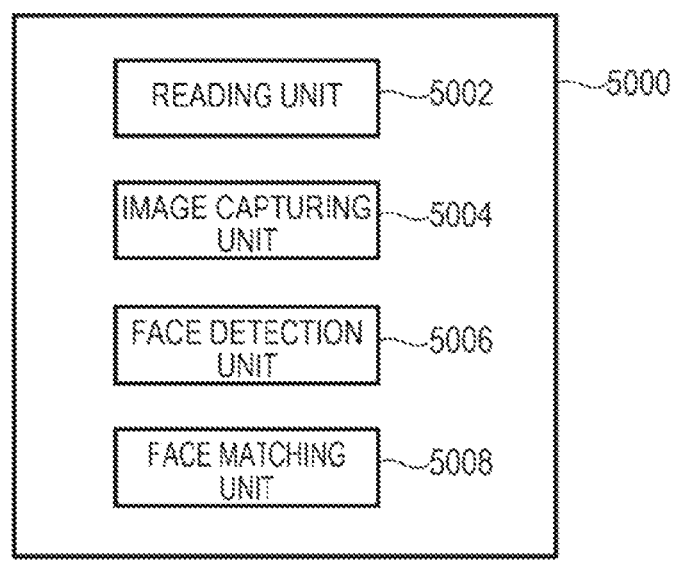
FIG. 26 is a black diagram illustrating a functional configuration of a face recognition system according to another example embodiment of the present invention.

The face recognition system illustrated in each of the example embodiments described above can be configured as illustrated in FIG. 26 according to another example embodiment. FIG. 26 is a block diagram illustrating a functional configuration of a face recognition system according to another example embodiment.

As illustrated in FIG. 26, a face recognition system 5000 according to another example embodiment has a reading unit 5002 that reads identification information from a medium carried by an authentication subject and an image capturing unit 5004 that captures an entrance side to an installation area of the reading unit 5002 to acquire an image. Further, the face recognition system 5000 has a face detection unit 5006 that detects a face image as a detected face image from the image acquired from the image capturing unit 5004. Furthermore, the face recognition system 5000 has a face matching unit 5008 that matches the detected face image detected by the face detection unit 5006 against a registered face image registered in association with the identification information read by the reading unit 5002. The face matching unit 5008 matches, against the registered face image, the detected face image captured by the image capturing unit 5004 before the reading unit 5002 reads the identification information.

Figure 27:
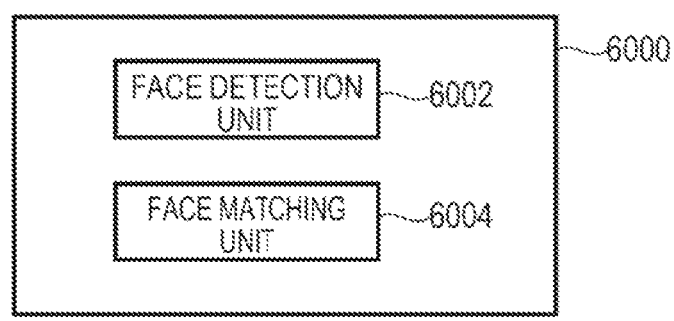
FIG. 27 is a black diagram illustrating a functional configuration of a face matching apparatus according to another example embodiment of the present invention.

Further, the face matching apparatus described in each of the above example embodiments can be configured as illustrated in FIG. 27 according to another example embodiment. FIG. 27 is a block diagram illustrating a functional configuration of a face matching apparatus according to another example embodiment.

As illustrated in FIG. 27, a face matching apparatus 6000 according to another example embodiment has a face detection unit 6002 that detects a face image from an image as a detected face image. The image by which the face detection unit 6002 detects the detected face image is acquired by an image capturing unit that captures and acquires an image of the entrance side to an installation area of a reading unit that reads identification information from an authentication subject. Furthermore, the face matching apparatus 6000 has a face matching unit 6004 that matches the detected face image detected by the face detection unit 6002 against a registered face image registered in association with the identification information read by the reading unit. The face matching unit 6004 matches the detected face image captured by the image capturing unit before the reading unit reads the identification information against the registered face image.

Figure 28:
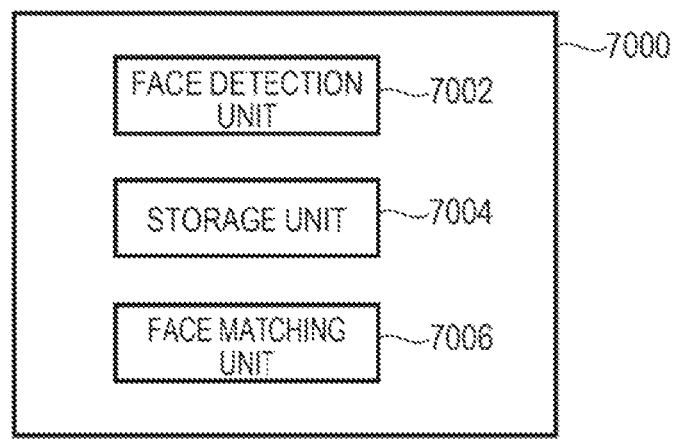
FIG. 28 is a black diagram illustrating a functional configuration of a face recognition system according to yet another example embodiment of the present invention.

Further, the face recognition system described in each of the above example embodiments can be configured as illustrated in FIG. 28 according to yet another example embodiment. FIG. 28 is a block diagram illustrating a functional configuration of a face recognition system according to yet another example embodiment.

As illustrated in FIG. 28, a face recognition system 7000 according to yet another example embodiment has a face detection unit 7002 that detects a face image from an image including an authentication subject as a detected face image. Further, the face recognition system 7000 has a storage unit 7004 that stores identification information identifying the authentication subject in association with a registered face image of the authentication subject. Furthermore, the face recognition system 7000 has a face matching unit 7006 that, in response to acquiring the identification information identifying the authentication subject, matches, against the registered face image corresponding to the acquired identification information, the detected face image detected by the face detection unit 7002 from the image captured before the acquisition.

Modified Example Embodiments

The present invention is not limited to the example embodiments described above, and various modifications are possible.

For example, while the situations where identity verification by face matching is performed for visitors who intend to enter the inside of the facility as authentication subjects and for shopping customers who make electronic payment as an authentication subject, respectively, have been described as examples in the above example embodiments, the invention is not limited thereto. An authentication subject refers to a person to be verified as to whether or not to have some authority, such as a visitor entering a facility, an entrant at immigration examination, or the like. A situation where identity verification by face matching may be a situation where identity verification by face matching is performed in immigration control, entrance and exit control for a room, or the like, for example.

Further, while the cases where the fixed camera 20 is used as an image capturing unit have been described as examples in the above example embodiments, a camera that functions as the image capturing unit is not limited thereto. For example, instead of the fixed camera 20, a movable camera in which the orientation thereof can be changed by a pan function, a tilt function, or the like may be used as the image capturing unit. In the case of a movable camera, the orientation thereof can be changed by automatic control or remote control.

Further, while the cases where identity verification by face matching is performed after ticket presentation is made by an authentication subject whose annual pass or membership card information is read by the reading unit 108 or 830 have been described as examples in the above example embodiments, the invention is not limited thereto. For example, the reading units 108 and 830 can be configured to read, from a medium carried by an authentication subject, identification information such as ID information uniquely identifying the medium by using wireless communication or the like without requiring action, namely, ticket presentation by an authentication subject.

The whole or part of the example embodiments disclosed above can be described as, but not limited to, the following supplementary notes.

(Supplementary Note 1)

A face recognition system comprising:
  a face detection unit that detects a face image from an image including an authentication subject as a detected face image;
  a storage unit that stores identification information identifying the authentication subject and a registered face image of the authentication subject in association with each other; and
  a face matching unit that, in response to acquisition of the identification information identifying the authentication subject, matches, against the registered face image corresponding to the acquired identification information, the detected face image detected by the face detection unit from an image captured before the acquisition.

(Supplementary Note 2)

The face recognition system according to supplementary note 1,
  wherein the face detection unit detects a plurality of detected face images from a plurality of frames of images, and
  wherein the face matching unit matches the plurality of detected face images against the registered face image.

(Supplementary Note 3)

The face recognition system according to supplementary note 2 further comprising a priority calculation unit that calculates a priority used for determining order of performing matching against the registered face image for the plurality of detected face images, wherein the face matching unit matches the plurality of detected face images against the registered face image in descending order of the priority calculated by the priority calculation unit.

(Supplementary Note 4)

The face recognition system according to supplementary note 2 or 3 further comprising an identical-person processing unit that classifies the plurality of detected face images on an identical person basis and calculates a priority for determining order of performing matching against the registered face image for the detected face image classified into the identical person, wherein the face matching unit matches the detected face image classified into the identical person against the registered face image in descending order of the priority calculated by the identical-person processing unit.

(Supplementary Note 5)

The face recognition system according to any one of supplementary notes 1 to 4 further comprising an update unit that registers, as a new registered face image, the detected face image in which matching against the registered face image is matched.

(Supplementary Note 6)

The face recognition system according to any one of supplementary notes 1 to 5 further comprising:

an image capturing unit that captures an image including the authentication subject; and another image capturing unit that captures a face image of the authentication subject and acquires the face image of the authentication subject when matching of the detected face image against the registered face image is not matched, wherein the face matching unit matches, against the registered face image, the face image of the authentication subject acquired by the another image capturing unit.

(Supplementary Note 7)

The face recognition system according to any one of supplementary notes 1 to 5 further comprising a display unit that displays the detected face image and the registered face image when matching of the detected face image and the registered face image is not matched.

(Supplementary Note 8)

The face recognition system according to any one of supplementary notes 1 to 7, wherein the face matching unit acquires, offline, the registered face image to be matched against the detected face image.

(Supplementary Note 9)

The face recognition system according to any one of supplementary notes 1 to 8 further comprising an image capturing unit that captures an image including the authentication subject, wherein the image capturing unit is installed in a vertical orientation so as to capture the image that is vertically long.

(Supplementary Note 10)

A face recognition method comprising:

detecting a face image from an image including an authentication subject as a detected face image; and in response to acquisition of the identification information identifying the authentication subject, matching, against a registered face image registered in association with the acquired identification information, the detected face image detected from an image captured before the acquisition.

(Supplementary Note 11)

The face recognition method according to supplementary note 10 further comprising:

detecting a plurality of detected face images from a plurality of frames of images; and matching the plurality of detected face images against the registered face image.

(Supplementary Note 12)

A storage medium in which a program is stored, wherein the program causes a computer to execute:

detecting a face image from an image including an authentication subject as a detected face image; and in response to acquisition of the identification information identifying the authentication subject, matching, against a registered face image registered in association with the acquired identification information, the detected face image detected from an image captured before the acquisition.

While the present invention has been described with reference to the example embodiments, the present invention is not limited to the example embodiment described above. Various modification that can be understood by those skilled in the art can be made to the configuration or the details of the present invention within the scope of the present invention.

This application is based upon and claims the benefit of priority from Japanese Patent Application No. 2016-036406, filed on Feb. 26, 2016, the disclosure of which is incorporated herein in its entirety by reference.

REFERENCE SIGNS LIST 1, 2, 3, 4, 5 face recognition system
10 gate apparatus
20 fixed camera
30 face matching apparatus
40 datacenter server
108 reading unit
110 hand camera
112 gate control unit
302 face matching control unit
304 storage unit
308 image data acquisition unit
310 face detection unit
312 face feature amount extraction unit
314 face matching unit
318 priority calculation unit
320 identical-person processing unit
324 storage unit
402 control unit
404 storage unit
810 register terminal
830 reading unit

The invention claimed is:

1. A face recognition system comprising:
a memory configured to store instructions; and
a processor configured to execute the instructions to:
detect a plurality of faces from a plurality of images captured by a camera, each of the plurality of faces corresponding to a different person;
acquire, from a database, a plurality of registered images that are stored in the database;
identify, from the plurality of images, a face image to be used for matching, based on quality; and
compare the plurality of registered face images with the identified face image to identify the registered face image that the identified face image matches, wherein the identified face image is captured before an authentication subject having the face in the identified face image arrives at a gate.

2. The face recognition system according to claim 1, wherein the processor is further configured to execute the instructions to:
calculate the quality of each of the plurality of images.

3. The face recognition system according to claim 1, wherein the processor is further configured to execute the instructions to:
acquire, from the database, identification information related to the registered face image that the identified face image matches.

4. The face recognition system according to claim 1, wherein the identified face image is captured before identification information is presented by the authentication subject.

5. The face recognition system according to claim 1, wherein the face image to be used for matching is captured in a predetermined period.

6. The face recognition system according to claim 1, wherein the identified face image is captured before the authentication subject makes a payment, and
wherein the processor is further configured to execute the instructions to:
perform the payment based on payment information corresponding to the registered face image that the identified face image matches.

7. A face recognition system comprising:
a memory configured to store instructions;
a processor configured to execute the instructions to:
detect a plurality of faces from a plurality of images captured by a camera, each of the plurality of faces corresponding to a different person;
acquire, from a database, a plurality of registered images that are stored in the database;
identify, from the plurality of images, the image in which the detected face is closest to a gate, as a face image to be used for matching; and
compare the plurality of the registered face images with the identified face image to identify the registered face image that the identified face image matches,
wherein the identified face image is captured before an authentication subject having the face in the identified face image arrives at a gate.

8. The face recognition system according to claim 7, wherein the processor is further configured to execute the instructions to:
identify, from the plurality of images, the image in which the detected face is largest, as the face image to be used for matching.

9. The face recognition system according to claim 7, wherein the processor is further configured to execute the instructions to:
acquire, from the database, identification information related to the registered face image that the identified face image matches.

10. The face recognition system according to claim 7, wherein the identified face image is captured before identification information is presented by the authentication subject.

11. The face recognition system according to claim 7, wherein the face image to be used for matching is captured in a predetermined period.

12. The face recognition system according to claim 7, wherein the identified face image is captured before the authentication subject makes a payment, and
wherein the processor is further configured to execute the instructions to:
perform the payment based on payment information corresponding to the registered face image that the identified face image matches.

13. A face recognition method performed by a processor and comprising:
detecting a plurality of faces from a plurality of images captured by a camera, each of the plurality of faces corresponding to a different person;
acquiring, from a database, a plurality of registered images that are stored in the database;
identifying, from the plurality of images, a face image to be used for matching, based on quality; and
comparing the plurality of registered face images with the identified face image to identify the registered face image that the identified face image matches,
wherein the identified face image is captured before an authentication subject having the face in the identified face image arrives at a gate.

14. The face recognition method according to claim 13, further comprising:
calculating the quality of each of the plurality of images.

15. The face recognition method according to claim 13, further comprising:
acquiring, from the database, identification information related to the registered face image that the identified face image matches.

16. The face recognition method according to claim 13, wherein the identified face image is captured before identification information is presented by the authentication subject.

17. The face recognition method according to claim 13, wherein the face image to be used for matching is captured in a predetermined period.

18. The face recognition method according to claim 13, wherein the identified face image is captured before the authentication subject makes a payment, and
wherein the method further comprises:
performing the payment based on payment information corresponding to the registered face image that the identified face image matches.

* * * * *